(12) United States Patent
Steele, III et al.

(10) Patent No.: US 12,205,382 B2
(45) Date of Patent: Jan. 21, 2025

(54) APPARATUS AND METHOD FOR AUTOMATIC LICENSE PLATE RECOGNITION OF A VEHICLE

(71) Applicant: Quick Quack Car Wash Holdings, LLC, Roseville, CA (US)

(72) Inventors: Joseph Allen Steele, III, Plumas Lake, CA (US); Josh David Schumacher, Sacramento, CA (US); Tyler Ellison Ebding, Martinez, CA (US); Franklin Christopher Brooks, Sacramento, CA (US)

( * ) Notice: Subject to any disclaimer, the term of this patent is extended or adjusted under 35 U.S.C. 154(b) by 0 days.

(21) Appl. No.: 18/195,537

(22) Filed: May 10, 2023

(65) Prior Publication Data

US 2024/0378906 A1    Nov. 14, 2024

(51) Int. Cl.
*G06V 20/62*     (2022.01)
*G06T 5/77*      (2024.01)
(Continued)

(52) U.S. Cl.
CPC .............. *G06V 20/625* (2022.01); *G06T 5/77* (2024.01); *G06T 7/0002* (2013.01); *G06T 7/11* (2017.01); *G06V 10/25* (2022.01); *G06V 10/44* (2022.01); *G06V 10/82* (2022.01); *G06V 20/56* (2022.01); *G06T 2207/30168* (2013.01); *G06T 2207/30252* (2013.01)

(58) Field of Classification Search
CPC . G06T 5/77; G06T 7/0002; G06T 7/11; G06T 2207/30168; G06T 2207/30252; G06V 10/25; G06V 10/44; G06V 10/82; G06V 20/56; G06V 20/625
See application file for complete search history.

(56) References Cited

U.S. PATENT DOCUMENTS 6,757,008 B1 *  6/2004  Smith ................ H04N 23/698
                                                348/169
9,503,844 B1 * 11/2016  Sprague .............. H04W 4/023
(Continued)

FOREIGN PATENT DOCUMENTS

CN          108528405 A  *  9/2018  ............... B60S 3/04
KR     10-2022-0124430 A      9/2022
KR        10-2458896 B1      10/2022

*Primary Examiner* — Katrina R Fujita
(74) *Attorney, Agent, or Firm* — Caldwell Intellectual Property Law

(57) ABSTRACT

An apparatus and method for automatic license plate recognition of a vehicle, the apparatus includes a user device configured to receive a user input containing reference indicators and associate a right to the reference indicators, an image capturing device configured to capture vehicle images of a vehicle containing a license plate region, an image processing module configured to receive the vehicle images from the image capturing device and process the vehicle images, a computer vision module configured to determine an obscurity of the license plate region, and identify indicators as a function of the license plate region, an image inpainting module configured to reconstruct the license plate region based on the obscurity of the license plate using an image inpainting technique, and a validation module configured to validate the indicators as a function of the reference indicators and grant the user the right as a function of the validation.

20 Claims, 8 Drawing Sheets

(51) Int. Cl.
*G06T 7/00* (2017.01)
*G06T 7/11* (2017.01)
*G06V 10/25* (2022.01)
*G06V 10/44* (2022.01)
*G06V 10/82* (2022.01)
*G06V 20/56* (2022.01)

(56) References Cited

U.S. PATENT DOCUMENTS

| | | | |
|---|---|---|---|
| 10,846,945 B2* | 11/2020 | Wu | G07C 5/008 |
| 2006/0030985 A1* | 2/2006 | Lawida | G08G 1/04 |
| | | | 707/E17.005 |
| 2013/0117078 A1* | 5/2013 | Weik, III | G06Q 10/00 |
| | | | 705/13 |
| 2014/0039987 A1* | 2/2014 | Nerayoff | G08G 1/14 |
| | | | 348/148 |
| 2014/0307923 A1* | 10/2014 | Johansson | G06V 20/20 |
| | | | 382/105 |
| 2016/0217117 A1* | 7/2016 | Masalovitch | G06T 5/77 |
| 2017/0046672 A1* | 2/2017 | Cha | G08G 1/0175 |
| 2017/0262723 A1* | 9/2017 | Kozitsky | G06V 20/62 |
| 2019/0043201 A1* | 2/2019 | Strong | G06V 10/96 |
| 2019/0114781 A1* | 4/2019 | Gao | G06T 7/194 |
| 2019/0355103 A1* | 11/2019 | Baek | G06T 5/60 |
| 2020/0026970 A1* | 1/2020 | Berseth | G06V 30/2455 |
| 2020/0117946 A1* | 4/2020 | Che | G06T 7/20 |
| 2020/0293794 A1* | 9/2020 | Popov | G06F 18/2411 |
| 2020/0410246 A1* | 12/2020 | Ramirez | G06F 18/22 |
| 2021/0125313 A1* | 4/2021 | Bai | G06V 10/806 |
| 2021/0326645 A1* | 10/2021 | Cromp | G06N 3/045 |
| 2022/0036114 A1 | 2/2022 | Chigos | |
| 2022/0405519 A1 | 12/2022 | Guzik | |
| 2023/0125264 A1* | 4/2023 | Parameswaran | G06V 20/52 |
| | | | 382/103 |
| 2023/0216999 A1* | 7/2023 | Zobel | G06T 5/60 |
| | | | 348/42 |

* cited by examiner

APPARATUS AND METHOD FOR AUTOMATIC LICENSE PLATE RECOGNITION OF A VEHICLE

FIELD OF THE INVENTION

The present invention generally relates to the field of data recognition. In particular, the present invention is directed to an apparatus and method for automatic license plate recognition of a vehicle.

BACKGROUND

Current methods of verifying information at an entry point of a vehicle service site are insufficient, wherein the effectiveness of current methods may depend on the accuracy of data recognition under various environmental conditions and with diverse vehicles designs. There is a need for a method wherein effective authorization at the entry point allows access to a plurality of data to provide a personalized experience at the vehicle service site upon entry.

SUMMARY OF THE DISCLOSURE

In an aspect, an apparatus for automatic license plate recognition of a vehicle is described. The apparatus includes a data collection unit, wherein the data collection unit includes a user device configured to receive a user input from a user, wherein the user input includes a plurality of reference indicators and associate at least a right to the plurality of reference indicators, and at least an image capturing device configured to capture a plurality of vehicle images of a vehicle from a plurality of angles and distances, wherein at least a vehicle image of the plurality of vehicle images includes a license plate region, and a control module communicatively connected to the data collection unit, wherein the control module includes an image processing module, wherein the image processing module is configured to receive the plurality of vehicle images from the at least an image capturing device, and process the plurality of vehicle images, wherein processing the plurality of vehicle images includes isolating the license plate region from the at least a vehicle image as a function of a plurality of image processing techniques, a computer vision module, wherein the computer vision module is configured to determine an obscurity of the license plate region, and identify a plurality of indicators as a function of the license plate region, an image inpainting module operatively connected to the image processing module, wherein the image inpainting module is configured to reconstruct the license plate region as a function of the obscurity of the license plate using an image inpainting technique, and a validation module configured to validate the plurality of indicators as a function of the plurality of reference indicators and grant the user the at least a right associated to the plurality of reference indicators to the user as a function of the validation of the plurality of indicators.

In another aspect, a method for automatic license plate recognition of a vehicle is described. The method includes receiving, by a user device of a data collection unit, a plurality of reference indicators from a user, associating, by the user device of the data collection unit, at least a right to the plurality of reference indicators, capturing, by at least an image capturing device, a plurality of vehicle images of a vehicle from a plurality of angles and distances, wherein at least a vehicle image of the plurality of vehicle images includes a license plate region, receiving, by an image processing module of a control module communicatively connected to the data collection unit, the plurality of vehicle images from the at least an image capturing device, processing, by the image processing module of the control module, the plurality of vehicle images, wherein processing the plurality of vehicle images includes isolating the license plate region from the at least a vehicle image as a function of a plurality of image processing techniques, determining, by a computer vision module of the control module, an obscurity of the license plate region, reconstructing, by an image inpainting module operatively connected to the image processing module of the control module, the license plate region as a function of the obscurity of the license plate using an image inpainting technique, identifying, by the computer vision module of the control module, a plurality of indicators as a function of the license plate region, validating, by a validation module of the control module, the plurality of indicators as a function of the plurality of reference indicators, and granting, by the validation module of the control module, the at least a right associated with the plurality of reference indicators to the user as a function of the validation of plurality of indicators.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
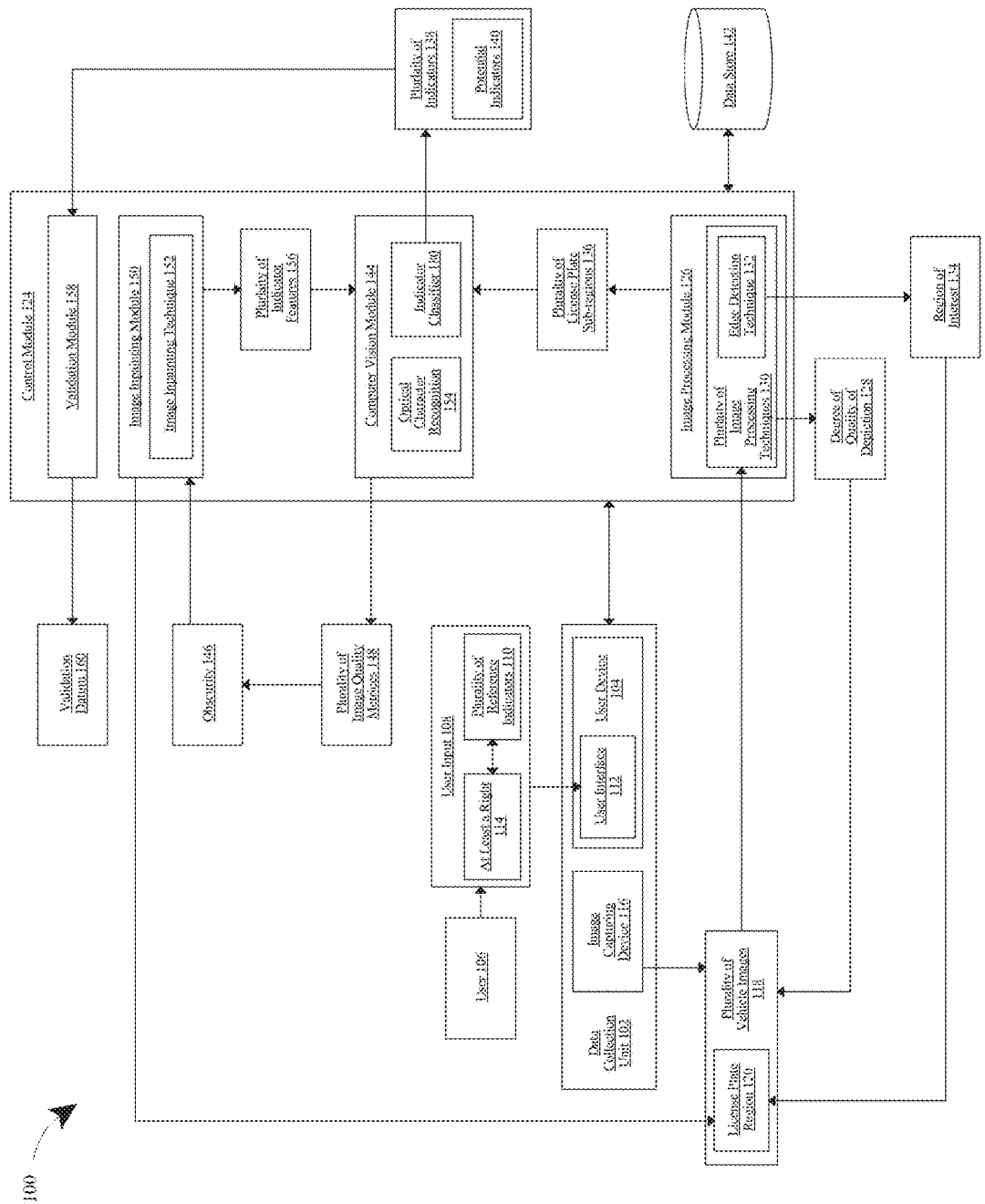
FIG. 1 is a diagram of an exemplary embodiment of an apparatus for automatic license plate recognition of a vehicle.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for automatic license plate recognition of a vehicle. In an embodiment, apparatus includes a data collection unit, wherein the data collection unit includes a user device configured to receive a user input containing a plurality of reference indicators and associate at least a right to the plurality of reference indicators, and at least an image capturing device configured to capture a plurality of vehicle images of a vehicle from a plurality of angles and distances, wherein at least a vehicle image of the plurality of vehicle images includes a license plate region.

Aspects of the present disclosure can be used to isolating the license plate region from the at least a vehicle image as a function of a plurality of image processing techniques. Aspects of the present disclosure can also be used to determine an obscurity of the license plate region and identify a plurality of indicators as a function of the license plate region. This is so, at least in part, because apparatus includes a control module communicatively connected to the data collection unit, wherein the control module includes an image processing module and a computer vision module.

Aspects of the present disclosure allow for reconstructing the license plate region as a function of the obscurity of the license plate using an image inpainting technique. Aspects of the present disclosure allow for a non-stop vehicle service at a vehicle service site. This is so, at least in part, because control module further includes a validation module configured to validate the plurality of indicators as a function of the plurality of reference indicators and grant the user the at least a right associated with the plurality of reference indicators as a function of the validation of the plurality of indicators. Exemplary embodiments illustrating aspects of the present disclosure are described below in the context of several specific examples.

In an embodiment, apparatus and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Now referring to FIG. 1, an exemplary embodiment of an apparatus 100 for automatic license plate recognition of a vehicle is illustrated. In some cases, vehicle may include, without limitation, car, truck, buses, motorcycles, boats, airplane, and the like. Apparatus 100 includes a data collection unit 102. As used in this disclosure, a "data collection unit" is a component responsible for gathering relevant data from various sources to support further processing steps as described below. Data collection unit 102 may include a user device 104. As used in this disclosure, a "user device" is a device used by an individual (i.e., a user 106) to access, interact with, or perform processing tasks. In a non-limiting example, user devices may include, without limitation, desktop computer, laptops, tables, smartphones, any other mobile devices, and the like. In some cases, user 106 may include an individual who owns the vehicle and/or interested in one or more services related to the vehicle. In some cases, user 106 may include an individual who works at a vehicle service site (i.e., service staff, site employee, and/or the like). In other cases, user 106 may include a plurality of individuals; for instance, and without limitation, user 106 may include a family, a group, a team, a company, and/or the like. A "vehicle service site" is a location or establishment that offers a plurality of vehicle services. "Vehicle services," as described herein, is any activity, feature, or otherwise services in association with a designated vehicle. In a non-limiting example, vehicle service site may include a car wash site. Vehicle service may include, without limitation, a car washing service, a car vacuuming service, and/or the like. Data collected by data collection unit 102 may include information related to or otherwise required by vehicle service site for performing one or more vehicle services.

With continued reference to FIG. 1, user device 104 is configured to receive a user input 108 from user 106. As used in this disclosure, a "user input" refers to information, data, or commands provided by user 106 to user device 104 through various input methods enabled by various input devices such as, without limitation, keyboard, touchscreen, voice command, gestures, and/or the like. User input 108 may allow user to communicate data (containing intentions, preferences, and/or requirements) to apparatus 100. In a non-limiting example, user input 108 may include a plurality of reference indicators 110 as described below. In an embodiment, user device 104 may include a user interface 112. For the purpose of this disclosure, a "user interface" is a graphical, textural, or otherwise auditory components through which user 106 interact with user device 104. In some cases, user interface may facilitate communication between user 106 and apparatus 100, allowing user 106 to input commands, make selections, view information, and/or the like. In a non-limiting example, user interface 112 may include a graphical user interface (GUI). GUI may include a visual representation of the system. In some cases, GUI may include a plurality of user interaction elements such as, without limitation, icons, buttons, menus, textbox, any other graphical elements that user may be able to interact (e.g., click, tap, swipe, drag, and/or the like) to perform specific actions; for instance, and without limitation, user interface 112 may include a GUI configured to display a textbox configured to accepting user input 108 containing plurality of reference indicators 110.

With continued reference to FIG. 1, as used in this disclosure, "reference indicators" is a set of predefined indicators. In some cases, plurality of reference indicators 110 may be predefined by user 106. An "indicator," as described herein, is a symbol illustrated on license plate of the vehicle. In a non-limiting example, indicator may include a number, a letter, a special character, and/or the like. Other exemplary embodiments of indicator may be described in further detail below. In some cases, Plurality of reference indicators 110 may include license plate number listed in the registration of user's vehicle (i.e., valid license plate number). Such reference indicators 110 may be used to pull information such as, without limitation, vehicle information (e.g., vehicle make and model, vehicle registration information, VIN, and/or the like), user (i.e., vehicle owner) information (e.g., name, address, driver's license number, insurance information, accident history, and/or the like) from a data store as described in further detail below.

Still referring to FIG. 1, user device 104 is configured to associate at least a right 114 to plurality of reference indicators 110. As used in this disclosure, "right" refers to a specific privilege or permission. In an embodiment, at least a right 114 may include an entitlement granted to the vehicle, vehicle owner, user 106, and/or the like based on their relationship with vehicle service site. In a non-limiting example, at least a right 114 may be determined based on the membership status of user 106. A "membership status," as described herein, is a classification or standing of user 106 within vehicle service site based on the user's participation, engagement, or otherwise adherence to the terms and conditions of a membership program. At least a right 114 that user 106 as a member may be entitled to receive and may be subject to change based on factors such as, without limitation, duration of membership, payment of fees, accumulation of loyalty points, or fulfillment of specific requirements. As an example, and without limitation, membership status may be categorized in a tiered membership levels: "Silver," "Gold," and "Platinum." Higher membership tiers may grant right 114 with more exclusive benefits or privileges.

With further reference to FIG. 1, in a non-limiting embodiment, at least a right 114 may include a parking right. As a non-limiting example, plurality of reference indicators 110 may be associated with a reserved parking space. In another non-limiting embodiment, at least a right 114 may include access to a restricted area; for instance, and without limitation, vehicle service site may include a plurality of restricted areas such as loading zone, maintenance area, secure facility, and/or the like. Plurality of reference indicators 110 may be linked to at least a right 114 to enter these restricted areas. In another non-limiting embodiment, at least a right 114 may include discounts or incentives. In such embodiment, vehicle service site may offer discount or incentives for certain customers, such as user 106 with a membership or employee at vehicle service site. Plurality of reference indicators 110 may be linked to these discounts or incentives. In a further non-limiting example, at least a right 114 may include a prepaid service. In a non-limiting example, plurality of reference indicator 110 may be linked to one or more prepaid services, such as car washes, fuel purchases, maintenance services, and/or the like. In this case, no additional payment at vehicle service site is required.

With continued reference to FIG. 1, apparatus 100 includes at least an image capturing device 116. In some cases, apparatus 100 may include a plurality of image capturing devices. As used in this disclosure, an "image capturing device" is a device that is capable of acquiring visual information in a form of digital images or videos. In an embodiment, each image capturing device of at least an image capturing device 116 may include a usage of a photosensitive element. In a non-limiting example, at least an image capturing device 116 may include a plurality of cameras. A "camera," as described herein, is a device that is configured to sense electromagnetic radiation, such as without limitation visible light, and generate an image representing the electromagnetic radiation. In some cases, the at least a camera may include one or more optics. For the purposes of this disclosure, an "optic" is a device that focuses and direct electromagnetic radiation to a target area. Exemplary non-limiting, the optics may include spherical lenses, aspherical lenses, reflectors, polarizers, filters, windows, aperture stops, and the like. In some cases, the at least a camera may include an image sensor. Exemplary non-limiting, the image sensors may include digital image sensors, such as without limitation charge-coupled device (CCD) sensors and complimentary metal-oxide-semiconductor (CMOS) sensors, chemical image sensors, and analog image sensors, such as without limitation film. In some cases, the at least a camera may be sensitive within a non-visible range of electromagnetic radiation, such as without limitation infrared.

With continued reference to FIG. 1, in an embodiment, at least an image capturing device 116 is configured to capture a plurality of vehicle images 118 of a vehicle from a plurality of angles and distances. As used in this disclosure, a "vehicle image" is an image of the vehicle, wherein an "image," for the purpose of this disclosure, is information representing at least a physical scene, space, and/or object. An image may be optical, such as without limitation where at least an optic is used to generate an image of an object. An image may be material, such as without limitation when film is used to capture an image. An image may be digital, such as without limitation when represented as a bitmap. In a non-limiting example, plurality of vehicle images 118 may illustrate various components and/or features of the vehicle such as vehicle's body, color, make, model, license plate, and the like. In some cases, plurality of vehicle images 118 may be captured, by plurality of image capturing device 116, as still images, or frames from a video stream. In other cases, plurality of vehicle images 118 may be taken as a "burst" of vehicle images by a at least an image capturing device 116, as a video feed including a live-streamed video of the vehicle. A "burst" of vehicle images, as described herein, is a set of images of a single object, such as the vehicle, taken in rapid succession. A burst may be performed by repeated manually actuated image captures, or may be an "automated burst," defined as a set of images that are automatically triggered by at least an image capturing device 116; an automated burst may be initiated by a manual actuation of, for example, without limitation, a camera button while in an automated burst mode configuring at least an image capturing device 116 and/or any computing device to perform and/or command automated burst upon a manual actuation, or may be triggered by an automated process and/or module such as a program, hardware component, application, a command or instruction from a remote device, or the like. In an embodiment, image analysis device 104 and/or another computing device may automatically direct and/or generate a burst or sequence of vehicle images 118.

With continued reference to FIG. 1, an exemplary image capturing devices 116 may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, detect and decode barcodes; capture images; and record video.

With continued reference to FIG. 1, in some embodiments, at least an image capturing device 116 may capture two or more perspectives for use in three-dimensional (3D) reconstruction. At least an image capturing device 116 may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. The TaraXL may include a USB 3.0 stereo-camera which is optimized for NVIDIA® Jetson AGX Xavier™/Jetson™ TX2 and NVIDIA GPU Cards. The TaraXL's accelerated Software Development Kit (TaraXL SDK) may be capable of doing high quality 3D depth mapping of WVGA at a rate of up to 60 frames per second. The TaraXL may be based on MT9V024 stereo sensor from ON Semiconductor. Additionally, the TaraXL may include a global shutter, houses 6 inertial measurement units (IMUs), and may allow mounting of optics by way of an S-mount lens holder. The TaraXL may operate at depth ranges of about 50 cm to about 300 cm. Persons skilled in the art, upon reviewing the entirety of this disclosure, will be aware of various types of cameras that may be used for the disclosure.

With continued reference to FIG. 1, in some embodiments, at least an image capturing device 116 may include at least a photodetector. For the purposes of this disclosure, a "photodetector" is any device that is sensitive to light and thereby able to detect light. In some embodiments, the at least a photodetector may be implemented in a camera. As a non-limiting example, the at least a photodetector may convert the light into electrical signals that can be processed by the camera's electronics to create an image. In some embodiments, the at least a photodetector may be implemented in the LiDAR system as described below. As a non-limiting example, the at least a photodetector may receive laser light from a light detecting and ranging (LiDAR) system that reflects off an object, such as but not limited to a vehicle, or environment and may convert it into an electrical signal, such as but not limited to LiDAR data of plurality of vehicle images 118. In some cases, at least a photodetector may be communicative with a computing device such as, but not limited to, a control module, such that the sensed signal such as but not limited to the LiDAR data of plurality of vehicle images 118 may be communicated with control module. LiDAR data and control module disclosed herein are further described in detail below.

Still referring to FIG. 1, in some cases, at least a photodetector may include a photodiode, a photoresistor, a photosensor, a photovoltaic chip, and the like. In some cases, the at least a photodetector may include a Germanium-based photodiode. The at least a photodetector may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. "Avalanche Photo Diodes (APDs)," as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When the reverse bias is less than the breakdown voltage, the gain of the APD may be approximately linear. For silicon APDs, this gain may be on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage may be referred to as a Single Photon Avalanche Diode, or SPAD. In this case, the n-p electric field may be sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode.

With further reference to FIG. 1, in some embodiments, at least a photodetector may include a charge-coupled device (CCD), a complementary metal-oxide-semiconductor (CMOS) sensor, and the like. As a non-limiting example, the CCD sensor may include an array of tiny pixels that are sensitive to light. As another non-limiting example, the CMOS sensor may include an array of photodiodes. In both CCD and CMOS sensors, the electrical charge generated by the photodetector may be converted into a voltage signal, which may be then amplified and converted into a digital signal by a camera's analog-to-digital converter (ADC). The digital signal may then be processed by the camera's electronics to create an image.

With continued reference to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, in some embodiments, at least a photodetector of image capturing device may be implemented in a light detection and ranging (LiDAR) system. In some embodiments, apparatus 100 may include the LiDAR system. For the purposes of this disclosure, a "light detection and ranging system" is a system for determining ranges by targeting an object or a surface with a laser and measuring the time for the reflected light to return to a receiver. As a non-limiting example, the LiDAR system may include a range-imaging camera, wherein the range-imaging camera that may be included in image capturing device, that may include Intel® RealSense™ D430 Module, from Intel® of Mountainview, California, U.S.A. The D430 Module may include active infrared (IR) illumination and a stereoscopic camera, having global shutters and frame rate of up to 90 fps. The D430 Module may provide a field of view (FOV) of 85.2° (horizontal) by 58° (vertical) and an image resolution of 1280×720. In some embodiments, the range-sensing camera may be operated independently by dedicated hardware, or, in some cases, range-sensing camera may be operated by a computing device. In some cases, the range-sensing camera may include software and firmware resources (for execution on hardware, such as without limitation dedicated hardware or a computing device). The D430 Module may be operated using software resources including but not limited to Intel® RealSense™ SDK 2.0, which may include opensource cross platform libraries.

Still referring to FIG. 1, in some embodiments, LiDAR system may include an optical source. For the purposes of this disclosure, an "optical source" is any device configured to emit electromagnetic radiation. As a non-limiting example, the electromagnetic radiation (also referred as light, laser, laser light, and the like) may include ultraviolet (UV), visible light, infrared light, and the like. In some embodiments, the LiDAR system may emit the electromagnetic radiation to an object such as but not limited to a vehicle using the optical source. In some cases, the optical source may include a non-coherent optical source configured to emit non-coherent light, for example a light emitting diode (LED). In some cases, the optical source may emit a light having substantially one wavelength. In some cases, the optical source may emit the light having a wavelength range. The light may have a wavelength in an ultraviolet range, a visible range, a near-infrared range, a mid-infrared range, and/or a far-infrared range. For example, in some cases the light may have a wavelength within a range from about 100 nm to about 20 micrometers. For another example, in some cases the light may have the wavelength within a range from about 500 nm to about 1550 nm. The optical source may include, one or more diode lasers, which may be fabricated, without limitation, as an element of an integrated circuit; diode lasers may include, without limitation, a Fabry Perot cavity laser, which may have multiple modes permitting outputting light of multiple wavelengths, a quantum dot and/or quantum well-based Fabry Perot cavity laser, an external cavity laser, a mode-locked laser such as a gain-absorber system, configured to output light of multiple wavelengths, a distributed feedback (DFB) laser, a distributed Bragg reflector (DBR) laser, an optical frequency comb, and/or a vertical cavity surface emitting laser. The optical source may additionally or alternatively include a light-emitting diode (LED), an organic LED (OLED) and/or any other light emitter.

With further reference to FIG. 1, in some embodiments, LiDAR system may include a scanner. For the purposes of this disclosure, a "scanner" is a rotating mirror or prism that directs laser in different directions. In some embodiments, the scanner may scan the laser in a horizontal, vertical pattern and wide arrange of angles to create a 3D point cloud of an object such as but not limited to a vehicle or environment. Additionally, or alternatively, LiDAR system may include timing electronics. For the purposes of this disclosure, a "timing electronic" is a device that is configured to control the timing and synchronization of an optical source, scanner, and photodetector. In an embodiment, the timing electronics may be configured to ensure that a laser pulse is emitted at the correct time and that the photodetector receives the reflected light at the appropriate time. In another embodiment, the timing electronics may be configured to coordinate the movement of the scanner to ensure that the laser pulse is directed towards a target area and that the reflected light is detected from the correct angle. In some embodiments, the timing electronics may include a timing circuit, which may generate precise pulses at a specific frequency. When the reflected light returns to the LiDAR system, it may be detected by the at least a photodetector. In some embodiments, the timing electronics may be configured to measure time-of-flight of the laser pulse. For the purposes of this disclosure, "time-of-flight" is the time it takes for a pulse of light to travel to a target area and back to LIDAR system. In some embodiments, based on the time-of-flight measurement and the speed of light, the distance to the target, such as but not limited to, a vehicle, can be calculated.

With continued reference to FIG. 1, in other embodiments, at least an image capturing device 116 may be integrated into user device 104. In a non-limiting example, user device 104 may include any computing device suitable for use as image capturing device 116, including without limitation a user mobile device with one or more cameras. Vehicle owner (i.e., user 106) may capture one or more vehicle images using a camera incorporated in and/or in communication with user device. In some cases, user device 104 may interact with other components of apparatus 100. In a non-limiting example, user may transmit user input 108 containing plurality of reference indicators 110, and/or plurality of vehicle images 118 to control module as described below for further processing.

With continued reference to FIG. 1, in some cases, plurality of vehicle images 118 may be captured by plurality of image capturing devices 116 at a preparation zone at a vehicle care site. A "preparation zone," for the purpose of this disclosure, is a designated area at vehicle care site for the vehicle that allows the vehicle and/or vehicle owner to prepare for an upcoming vehicle care. As described herein, a "vehicle care" is any activity, service, or feature that may be offered at vehicle service site or in association with any vehicle services. In a non-limiting example, vehicle service site may include a car wash site. Vehicle care may include, without limitation, a car washing service, a car vacuuming service, and the like. Activity offered at vehicle service site may include purchasing snacks or vehicle related products, manually operating one or more devices installed at vehicle service site such as, without limitation, plurality of vehicle care devices as described in further detail below, accessing utilities at vehicle service site (e.g., restrooms or other compartments/areas), and the like. In another non-limiting example, vehicle care may further include vehicle maintenance services such as, oil change, tire rotation, brake inspection, air filter replacement, battery service, cooling system flush, transmission service, timing belt replacement, spark plug replacement, and the like at a vehicle service site such as an independent auto repair shop. In some cases, plurality of image capturing devices 116 may be installed within/around preparation zone. In a non-limiting example, preparation zone may include at least a zone of a parking lot at vehicle care site. Plurality of image capturing devices 116 may be disposed at for example, entrance and/or exit of the at least a zone of the parking lot, and/or attached on any fixtures within parking lot at vehicle care site, such as, without limitation, fence, light poles, charging stations, and the like. In another non-limiting example, preparation zone may include a waiting spot in front of a car wash bay/tunnel. Plurality of vehicle images 118 may be captured, by plurality of image capturing devices 116, before the vehicle enters the car wash bay/tunnel for a car wash service. In other cases, plurality of vehicle images 118 may be captured by at least an image capturing device 116 while the vehicle is at/within a car wash bay/tunnel. Plurality of vehicle images 118 may be captured by at least an image capturing device 116 after the vehicle undergo one or more vehicle services at the vehicle care site.

With continued reference to FIG. 1, in an embodiment, at least an image capturing device 116 may include at least an image capturing device that is positioned parallel (i.e., 0-degree angle) to the direction of vehicle movement. In a non-limiting example, at least an image capturing device 116 may include at least a front-facing camera or a rear-facing camera, wherein the at least a front-facing camera or rear-facing camera may be placed at a distance of a-b feet (a'-b' m) in front of the vehicle location or preparation zone and mounted at a height of x-y ft (x'-y' m) above the ground. In some cases, at least a front-facing camera or rear-facing camera may be mounted at a height of 3-6 ft (0.9-1.8 m) above the ground to align with the typical license plate height on vehicles.

Still referring to FIG. 1, in another embodiment, plurality of image capturing device 116 may include at least an image capturing device that is positioned perpendicular (90-degree angle) to the direction of vehicle movement. In a non-limiting example, at least an image capturing device 116 may include at least a side-facing camera, wherein the at least a side-facing camera may be placed at a distance of a-b feet (a'-b' m) from a side (i.e., right side and/or left side of) vehicle location or preparation zone and mounted at a height of x-y ft (x'-y' m) above the ground. In some cases, at least a side-facing camera may be mounted at a height of 3-6 ft (0.9-1.8 m) above the ground to align with the typical license plate height on vehicles.

With further reference to FIG. 1, in a further embodiment, plurality of image capturing device 116 may include at least an image capturing device that is positioned at an oblique angle, for example, and without limitation, between x-y degree, to the direction of the vehicle movement. In a non-limiting example, at least an image capturing device 116 may include at least an oblique camera, wherein the at least an oblique camera may be placed at a distance of a-b feet (a'-b' m) around the vehicle location or preparation zone and mounted at a height of x-y ft (x'-y' m) above the ground.

With continued reference to FIG. 1, in some cases, plurality of vehicle images 118 captured by at least an image capturing device 116 may be expressed in pixels (width× height). In an embodiment, plurality of vehicle image 118 may include high resolution vehicle images (i.e., vehicle images with higher dimensions) containing more details of the vehicle. In some cases, plurality of vehicle images 118 may be in a consistent file format such as, without limitation, JPEG, PNG, TIFF, or the like. Additionally, or alternatively, plurality of vehicle images may include a consistent color representation such as, without limitation, RGB (Red, Green, Blude), grayscale, HSV (Hue, Saturation, Value), or the like.

Still referring to FIG. 1, each vehicle image of plurality of vehicle images 118 may include at least an image capture parameter. As used in this disclosure, an "image capture parameter" is a setting or a condition used by at least an image capturing device 116 to capture digital image, such as, without limitation, plurality of vehicle images 118. In an embodiment, plurality of vehicle images 118 may include one or more vehicle images has at least an image capture parameter differing from an image capture parameter of one or more other vehicle images of plurality of vehicle images 118. In a non-limiting example, image capture parameter may include any parameter affecting circumstances and/or manner of image capture, including without limitation focal length, filter, lighting, aperture, film speed (digital or analog), frame rate, image resolution (e.g., in pixels), color filter (whether physical or virtual), wavelengths captured, or the like. In some cases, plurality of vehicle images 118 For instance, and without limitation, some images of plurality of images may be taken by one or more image capturing devices with flashes, some without, some with wide apertures, some with narrow apertures, at varied angles, and/or at varied focal lengths.

With continued reference to FIG. 1, plurality of vehicle images 118 captured by at least an image capturing device 116 may include at least a vehicle image containing a license plate region 120. As used in this disclosure, a "license plate region" refers to a specific area within at least a vehicle image containing a license plate of the vehicle, wherein the license plate displays a unique combination of characters (letters and/or numbers) issued by a government authority to identify a particular vehicle. In an embodiment, license plate region 120 may include visual information related to license plate shape and size; for instance, and without limitation, the dimensions and general shape of the license plate. In some cases, license plate shape and size may vary depending on the jurisdiction, country/state, or vehicle type. In a non-limiting example, license plate region 120 may include a rectangular area containing the license plate of a vehicle. In another embodiment, license plate region 120 may include visual information related to license plate background color and pattern; for instance, and without limitation, license plate region 120 may include the background color and design of the license plate of a vehicle. In a non-limiting example, license plate region 120 may include a background containing specific patterns, gradients, and/or images. In some cases, background of license plate region may impact the readability of the characters and effectiveness of image processing techniques. Image processing techniques and other exemplary embodiments of license plate region 120 are described in further detail below.

With continued reference to FIG. 1, in an embodiment, capturing plurality of vehicle images 118 may include capturing, by at least an image capturing device 116, a first vehicle image including a first license plate region and capturing, by at least an image capturing devices 116, a second vehicle image including a second license plate region, wherein the first vehicle image may be captured at the front portion of the vehicle and the second vehicle image may be captured at the rear portion of the vehicle. In a non-limiting example, at least an image capturing device 116 may include a first image capturing device located at the font of preparation zone and a second image capturing device located at the back of preparation zone, wherein the first image capturing device may be configured to capture one or more vehicle images containing a first license plate region illustrating a front license plate of the vehicle while the second image capturing device may be configured to capture one or more vehicle images containing a second license plate region illustrating a back license plate of the vehicle. In such embodiment, the vehicle may be in a stationary position while at least an image capturing device 116 capturing plurality of vehicle images 118. In another non-limiting example, at least an image capturing device 116 may include a single image capturing device, wherein the singular image capturing device may be located at the center of preparation zone and may not cause any interference to passing vehicles. In such embodiment, singular image capturing device may be able to capture plurality of vehicle images containing both front license plate and back license plate as the vehicle passes by or is in stationary position. Configuration of at least an image capturing device at vehicle care site is described in further detail below in reference to FIGS. 2A-B.

With continued reference to FIG. 1, apparatus 100 includes a control module 124. Control module 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Control module 124 may include a single computing device operating independently, or may include two or more computing device operating in concert, in parallel, sequentially or the like; two or more computing devices may be included together in a single computing device or in two or more computing devices. Control module 124 may interface or communicate with one or more additional devices as described below in further detail via a network interface device. Network interface device may be utilized for connecting control module 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Control module 124 may include but is not limited to, for example, a computing device or cluster of computing devices in a first location and a second computing device or cluster of computing devices in a second location. Control module 124 may include one or more computing devices dedicated to data storage, security, distribution of traffic for load balancing, and the like. Control module 124 may distribute one or more computing tasks as described below across a plurality of computing devices of computing device, which may operate in parallel, in series, redundantly, or in any other manner used for distribution of tasks or memory between computing devices. Control module 124 may be implemented using a "shared nothing" architecture in which data is cached at the worker, in an embodiment, this may enable scalability of apparatus 100 and/or computing device.

With continued reference to FIG. 1, control module 124 may be designed and/or configured to perform any method, method step, or sequence of method steps in any embodiment described in this disclosure, in any order and with any degree of repetition. For instance, control module 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Control module 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, control module 124 is communicatively connected to data collection unit 102 as described above. In some cases, control module 124 may communicate with user device 104; for instance, and without limitation, control module 124 may be configured to receive user input 108 from user device 104. In some cases, control module 124 may be configured to operate at least an image capturing device 116; for instance, and without limitation, enabling at least an image capturing device 116 to capture plurality of vehicle images 118 as described above. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, control module 124 may perform determinations, classification, and/or analysis steps, methods, processes, or the like for the purposes of this disclosure using machine-learning processes. A "machine-learning process," as used in this disclosure, is a process that automatedly uses a body of data known as "training data" and/or a "training set" (described further below in this disclosure) to generate an algorithm that will be performed by control module 124 to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, control module 124 includes an image processing module 120. As used in this disclosure, an "image processing module" is a component of control module 124 designed to process digital images such as, without limitation, plurality of vehicle images 118. In an embodiment, image processing module 120 may include a plurality of software algorithms that can analyze, manipulate, or otherwise enhance plurality of vehicle images 118, such as, without limitation, a plurality of image processing techniques as described below. In another embodiment, image processing module 120 may slow include hardware components such as, without limitation, one or more graphics processing units (GPUs) that can accelerate the processing of large amount of vehicle images. In some cases, image processing module 120 may be implemented with one or more image processing libraries such as, without limitation, OpenCV, PIL/Pillow, ImageMagick, and the like.

With continued reference to FIG. 1, image processing module 120 is configured to receive plurality of vehicle images 118 from at least an image capturing device 116. In a non-limiting example, processing module 120 may be configured to receive the plurality of vehicle images 118 by generating a first image capture parameter, transmitting a command to at least an image capturing device 116 to take at least a first vehicle image of the plurality of vehicle images 118 with the first image capture parameter, generating a second image capture parameter, transmitting a command to at least an image capturing device 116 to take at least a second vehicle image of the plurality of vehicle images 118 with the second image capture parameter, and receiving, from at least an image capturing device 116, at least a first vehicle image and at least second vehicle image. In another non-limiting example, plurality of vehicle images 118 may be taken by at least an image capturing device 116 using the same image capture parameter. Image capture parameter may be generated as a function of user input. "Transmitting," as described herein, may include transmission of a command from control module 124 to components of apparatus such as, without limitation, at least an image capturing device 116, as well as remote transmission via wired or wireless network.

With continued reference to FIG. 1, plurality of vehicle images may be transmitted, from at least an image capturing device 116 to image processing module 120 of control module 124, via any suitable electronic communication protocol, including without limitation packet-based protocols such as transfer control protocol-internet protocol (TCP-IP), file transfer protocol (FTP) or the like. In case of user device of image capturing device, plurality of vehicle images 118 may be transmitted via a text messaging service such as simple message service (SMS) or the like. Plurality of vehicle images 118 may be received via a portable memory device such as a disc or "flash" drive, via local and/or near-field communication (NFC), or according to any other direct or indirect means for transmission and/or transfer of digital images. Receiving plurality of vehicle images 118 may include retrieval of plurality of vehicle images 118 from a data store containing plurality of vehicle images 118 as described below; for instance, and without limitation, plurality of vehicle images 118 may be retrieved using a query that, for instance, specifies a timestamp that one or more vehicle images may be required to match.

With continued reference to FIG. 1, image processing module 126 is configured to process the plurality of vehicle images 118. In an embodiment, control module 124 may configure image processing module 126 to compress and/or encode plurality of vehicle images 118 to reduce the file size and storage requirements while maintaining the essential visual information (e.g., visual information of license plate region 120) need for further processing steps as described below. In an embodiment, compression and/or encoding of plurality of vehicle images 118 may facilitate faster transmission of plurality of vehicle images 118 between plurality of modules of control modules 116 and/or over networks. In some cases, image processing module 126 may be configured to perform a lossless compression on plurality of vehicle images 118, wherein the lossless compression may maintain the original image quality of plurality of vehicle images 118. In a non-limiting example, image processing module 126 may utilize one or more lossless compression algorithms, such as, without limitation, Huffman coding, Lempel-Ziv-Welch (LZW), Run-Length Encoding (RLE), and/or the like to identify and remove redundancy in each vehicle image of plurality of vehicle images 118 without losing any information. In such embodiment, compressing and/or encoding each vehicle image of plurality of vehicle images 118 may include converting the file format of each vehicle image into PNG, GIF, lossless JPEG2000 or the like. In an embodiment, plurality of vehicle images 118 compressed via lossless compression may be perfectly reconstructed to the original form (e.g., original image resolution, dimension, color representation, format, and the like) of plurality of vehicle images 118. In other cases, image processing module 126 may be configured to perform a lossy compression on plurality of vehicle images 118, wherein the lossy compression may sacrifice some image quality of plurality of vehicle images to achieve higher compression ratios. In a non-limiting example, image processing module 126 may utilize one or more lossy compression algorithms, such as, without limitation, Discrete Cosine Transform (DCT) in JPEG or Wavelet Transform in JPEG2000, discard some less significant information within plurality of vehicle images 118, resulting in a smaller file size but a slight loss of image quality of plurality of vehicle images. In such embodiment, compressing and/or encoding each vehicle image of plurality of vehicle images 118 may include converting the file format of each vehicle image into JPEG, WebP, lossy JPEG2000, or the like.

With continued reference to FIG. 1, in an embodiment, processing plurality of vehicle images 118 may include determining a degree of quality of depiction 128 of license plate region 120 for each vehicle image of the plurality of vehicle images 118. As used in this disclosure, a "degree of quality of depiction" of license plate region 120 is the degree to which vehicle image clearly depicts a license plate region 120. In an embodiment, image processing module 126 of control module 124 may determine a degree of blurriness of each vehicle image of plurality of vehicle images 118. In a non-limiting example, image processing module 126 may perform a blur detection by taking a Fourier transform, or an approximation such as a Fast Fourier Transform (FFT) of each vehicle image of plurality of vehicle images 118 and analyzing a distribution of low and high frequencies in the resulting frequency-domain depiction of each vehicle image of plurality of vehicle images 118; for instance, and without limitation, numbers of high-frequency values below a threshold level may indicate blurriness. In another non-limiting example, detection of blurriness may be performed by convolving each vehicle image of plurality of vehicle images 118, a channel of each vehicle image of plurality of vehicle images 118, or the like with a Laplacian kernel; for instance, and without limitation, this may generate a numerical score reflecting a number of rapid changes in intensity shown in each vehicle image, such that a high score indicates clarity and a low score indicates blurriness. In some cases, blurriness detection may be performed using a Gradient-based operator, which measures operators based on the gradient or first derivative of each vehicle image of plurality of vehicle images 118, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of plurality of vehicle images 118. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of each vehicle image of plurality of vehicle images 118 from its frequency content. Additionally, or alternatively, image processing module 126 may be configured to rank plurality of vehicle images 118 according to degree of quality of depiction 128 of license plate region 120 and select a highest-ranking vehicle image from plurality of vehicle images 118.

With continued reference to FIG. 1, processing plurality of vehicle images 118 may include enhancing at least a vehicle image containing license plate region 120 via a plurality of image processing techniques 130 to improve the quality (or degree of quality of depiction 128) of at least a vehicle image for better processing and analysis as described further in this disclosure. In an embodiment, image processing module 126 may be configured to perform a noise reduction operation on at least a vehicle image containing license plate region 120, wherein the noise reduction operation may remove or minimize noise (arises from various sources, such as sensor limitations, poor lighting conditions, image compression, and/or the like), resulting in a cleaner and more visually coherent vehicle image. In some cases, noise reduction operation may be performed using one or more image filters; for instance, and without limitation, noise reduction operation may include Gaussian filtering, median filtering, bilateral filtering, and/or the like. Noise reduction operation may be done, by image processing module 126, by averaging or filtering out pixel values in neighborhood of each pixel of at least a vehicle image to reduce random variations.

Still referring to FIG. 1, in another embodiment, image processing module 126 may be configured to perform a contrast enhancement operation on at least a vehicle image containing license plate region 120. In some cases, at least a vehicle image may exhibit low contrast, making license plate region 120 difficult to distinguish from the background. Contrast enhancement operation may improve the contrast of at least a vehicle image containing license plate region 120 by stretching the intensity range of at least a vehicle image and/or redistributing the intensity values (i.e., degree of brightness or darkness of a pixel in at least a vehicle image). In a non-limiting example, intensity value may represent the gray level or color of each pixel, scale from 0 to 255 in intensity range for an 8-bit vehicle image, and scale from 0 to 16,777,215 in a 24-bit color vehicle image. In some cases, contrast enhancement operation may include, without limitation, histogram equalization, adaptive histogram equalization (CLAHE), contrast stretching, and/or the like. Image processing module 126 may be configured to adjust the brightness and darkness levels within the at least a vehicle image to make license plate region 120 more distinguishable (i.e., increase degree of quality of depiction 128). Additionally, or alternatively, image processing module 126 may be configured to perform a brightness normalization operation to correct variations in lighting conditions (i.e., uneven brightness levels). In some cases, at least a vehicle image may include a consistent brightness level across the entire license plate region 120 after brightness normalization operation performed by image processing module 126. In a non-limiting example, image processing module 126 may perform a global or local mean normalization, where the average intensity value of the entire vehicle image or license plate region 120 may be calculated and used to adjust the brightness levels.

With further reference to FIG. 1, in other embodiments, image processing module 126 may be configured to perform a color space conversion operation to increase degree of quality of depiction 128. In a non-limiting example, in case of color vehicle image (i.e., RGB vehicle image), image processing module 126 may be configured to convert RGB vehicle image to grayscale or HSV color space. Such conversion may emphasize the differences in intensity values between license plate region 120 and the background. Image processing module 126 may further be configured to perform an image sharpening operation such as, without limitation, unsharp masking, Laplacian sharpening, high-pass filtering, and/or the like. Image processing module 126 may use image sharpening operation to enhance the edges and fine details related to license plate region 120 within at least a vehicle image by emphasizing high-frequency components within at least a vehicle image.

With continued reference to FIG. 1, processing plurality of vehicle images 118 may include isolating license plate region 120 from at least a vehicle image as a function of plurality of image processing techniques 130. At least a vehicle image may include highest-ranking vehicle image selected by image processing module 126 as described above. In an embodiment, plurality of image processing techniques 130 may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of at least a vehicle image and used to determine an output pixel value for that location. In a non-limiting example, isolating license plate region 120 from at least a vehicle image may include applying a dilation operation, wherein the dilation operation is a basic morphological operation configured to expand or grow the boundaries of objects (e.g., car body, license plate, and the like) in at least a vehicle image. In another non-limiting example, isolating license plate region 120 from at least a vehicle image may include applying an erosion operation, wherein the erosion operation is a basic morphological operation configured to shrink or erode the boundaries of objects in at least a vehicle image. In another non-limiting example, isolating license plate region 120 from at least a vehicle image may include applying an opening operation, wherein the opening operation is a basic morphological operation configured to remove small objects or thin structures from at least a vehicle image while preserving larger structures. In a further non-limiting example, isolating license plate region 120 from at least a vehicle image may include applying a closing operation, wherein the closing operation is a basic morphological operation configured to fill in small gaps or holes in objects in at least a vehicle image while preserving the overall shape and size of the objects. These morphological operations may be performed by image processing module 126 to enhance the edges of objects, remove noise, or fill gaps in the license plate region 120 before further processing.

With continued reference to FIG. 1, in an embodiment, isolating license plate region 120 from at least a vehicle image may include utilizing an edge detection technique 132, which may detect one or more shapes defined by edges. An "edge detection technique," as used in this disclosure, includes a mathematical method that identifies points in a digital image, such as, without limitation, at least a vehicle image, at which the image brightness changes sharply and/or has discontinuities. In an embodiment, such points may be organized into straight and/or curved line segments, which may be referred to as "edges." Edge detection technique 132 may be performed, by image processing module 126, using any suitable edge detection algorithm, including without limitation Canny edge detection, Sobel operator edge detection, Prewitt operator edge detection, Laplacian operator edge detection, and/or Differential edge detection. Edge detection technique 132 may include phase congruency-based edge detection, which finds all locations of an image where all sinusoids in the frequency domain, for instance as generated using a Fourier decomposition, may have matching phases which may indicate a location of an edge. Edge detection technique 132 may be used to detect a shape of license plate located on a vehicle, indicating a window about the license plate; in an embodiment, edge detection technique 132 may be used to find closed figures formed by edges.

In a non-limiting example, and still referring to FIG. 1, isolating license plate region 120 from at least a vehicle image may include determining a region of interest (ROI) 134 via edge detection technique 132. As used in this disclosure, a "region of interest" is a specific area within a digital image, such as, without limitation, at least a vehicle image, that contains information relevant to further processing steps of control module 124 as described below, such as, without limitation, license plate region 120. In a non-limiting example, vehicle image that located outside ROI 134 may include irrelevant or extraneous information such as, without limitation, wheels, doors, mirrors, lights, and any other components besides license plate of vehicles. Such portion of vehicle image containing irrelevant or extraneous information may be disregarded, by image processing module 126, thereby allowing control module 124 to concentrate on the license plate of the vehicle. In some cases, ROI 134 may vary in size, shape, and/or location within at least a vehicle image. In a non-limiting example ROI 134 may be presented as a rectangular bounding box (length×width) around license plate region 120 on at least a vehicle image. In some cases, ROI 134 may specify one or more coordinates of one or more corners of rectangular bounding box, and/or length and/or width of rectangular bounding box around license plate region 120 on at least a vehicle image. Image processing module 126 may then be configured to isolate license plate region 120 from the at least a vehicle image based on ROI 134. In a non-limiting example, and without limitation, image processing module 126 may crop at least a vehicle image according to rectangular bounding box around license plate region 120.

With continued reference to FIG. 1, image processing module 126 may be configured to perform a connected component analysis (CCA) on at least a vehicle image for license plate region 120 isolation. As used in this disclosure, a "connected component analysis (CCA)," also know as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module 126 may convert at least a vehicle image into a binary image via a thresholding process, wherein the thresholding process may involve setting a threshold value that separates the pixels of at least a vehicle image corresponding to the license plate region 120 (foreground) from those corresponding to the background (i.e., the vehicle). Pixels with intensity values above the threshold may be set to 1 (white) and those below the threshold may be set to 0 (black). In an embodiment, CCA may be employed to detect and extract license plate region 120 by identifying a plurality of connected regions that exhibit specific properties or characteristics of the license plate. Image processing module 126 may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of the license plate may be retained, by image processing module 126 as image plate region 112, while other components May be discarded. Image processing module 126 may be further configured to extract license plate region 120 from at least a vehicle plate region 112 for further processing as described below.

With continued reference to FIG. 1, in an embodiment, isolating license plate region 120 from at least a vehicle image may include segmenting license plate region 120 into a plurality of license plate sub-regions 136. Segmenting license plate region 120 into plurality of license plate sub-regions 136 may include segmenting license plate region 120 as a function of ROI 134 and/or CCA via an image segmentation process. As used in this disclosure, an "image segmentation process" is a process for partition a digital image, such as, without limitation, a vehicle image, into one or more segments, wherein each segment represents a distinct part of the vehicle image. Image segmentation process may change the representation of plurality of vehicle images. Image segmentation process may be performed, by image processing module 126, via one or more image segmentation techniques. In a non-limiting example, image processing module 126 may perform a region-based segmentation, wherein the region-based segmentation involves growing regions from one or more seed points or pixels on at least a vehicle image based on a similarity criterion. Similarity criterion may include, without limitation, color, intensity, texture, and/or the like. In a non-limiting example, region-based segmentation may include region growing, region merging, watershed algorithms, and the like.

With continued reference to FIG. 1, as used in this disclosure, a "license plate sub-region" refers to a portion of license plate region 120 as described above. In a non-limiting example, each license plate sub-region of plurality of license plate sub-regions 136 may include a unique segmentation of license plate region 120 as described above. In an embodiment, each license plate sub-region of the plurality of license plate sub-regions 136 may include at least an indicator 138. Indicator 138 may include any indicators described in this disclosure. In a non-limiting example, license plate region 120 may include a plurality of indicators 138, wherein the plurality of indicators 138 may include a combination of letters, numbers, and/or special characters, horizontal or vertical stacked in single, or multiple rows within license plate region 120. In some cases, each indicator of plurality of indicators 138 may include a same/different font size (i.e., 6 inches by 12 inches, 520 mm by 110 mm. 372 mm by 134 mm, and/or the like) or a same/different font style (e.g., standard, embossed, italic, condensed, gothic, retro, and/or the like), In some cases, each indicator of plurality of indicators 138 may be in a same/different font color (e.g., white, green, blue, yellow, black, red, and/or the like) Additionally, or alternatively, indicator 138 may include a presence of other elements within the license plate region 120, such as, without limitation, jurisdiction name, logo/emblem/symbol, registration sticker, hologram, or the like. Further, indicator 138 may be in a computer readable format; for instance, and without limitation, indicator 138 may be expressed solely in textural/numerical format recognized by control module 124.

Additionally, or alternatively, and still referring to FIG. 1, at least an indicator 138 may include a potential indicator 140. As used in this disclosure, a "potential indicator" is a candidate indicator (element or a combination of elements) within license plate region 120 that may potentially represent an indicator (e.g., letter, number, special character, any visual elements and combinations thereof on license plate region 120). In an embodiment, potential indicator 140 may be subjected to further processing, such as one or more processing step described in this disclosure, to determine their true nature and relevance to the license plate information or derive at least an indicator 138. In a non-limiting example, potential indicator 140 may include one or more partially visible characters, wherein the partially visible characters may include incomplete letters and/or numbers on the license plate (due to occlusion or poor image quality). In this case, potential indicator 140 may include only a portion of indicator 138. In another non-limiting example, potential indicator 140 may include one or more reasonable guesses or predictions of indicator 138 determined by control module 124 as described in further detail below.

With continued reference to FIG. 1, plurality of reference indicators 110, plurality of vehicle images 118, processed vehicle images, isolated license plate region 120, plurality of indicators 138, and/or any data described in this disclosure may be stored, without limitation, in a data store 142. In a non-limiting example, data store 142 may include a database. Data store 142 may include any data structure for ordered storage and retrieval of data, which may be implemented as a hardware or software module. Data store 142 may be implemented, without limitation, as a relational database, a key-value retrieval datastore such as a NOSQL database, or any other format or structure for use as a datastore that a person skilled in the art would recognize as suitable upon review of the entirety of this disclosure. Data store 142 may include a plurality of data entries and/or records corresponding to user tests as described above. Data entries in data store 142 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a data store 142 may reflect categories, cohorts, and/or populations of data consistently with this disclosure. Data store 142 may be located in control module 124, for example a memory of control module 124 and/or on another device in and/or in communication with apparatus 100.

With continued reference to FIG. 1, control module 124 includes a computer vision module 144. As used in this disclosure, a "computer vision module" is a component of control module 124 that is configured to perform computer vision tasks. "Computer vision," as used in this disclosure is defined as a field of artificial intelligence (AI) enabling computing device to derive information from visual data such as images and/or videos. In some cases, computer vision tasks may include, without limitation, feature extraction, image/video interpretation, image/video analysis, and the like. In an embodiment, computer vision module 144 may be configured to receive plurality of processed vehicle images from image processing module 126 as described above. In a non-limiting example, computer vision module 144 is configured to determine an obscurity 146 of license plate region 120, wherein the license plate region 120 may be isolated, by image processing module 126, from at least a preprocessed vehicle image and transmitted, by image processing module 126 to computer vision module 144. Plurality of vehicle images 118 may be preprocessed using a plurality of image processing techniques 130 as described in this disclosure; for instance, and without limitation, plurality of vehicle images 118 may be enhanced via applying a gaussian filter (i.e., a filter configured to reduce high-frequency noise) before the license plate region 120 isolation.

Still referring to FIG. 1, as used in this disclosure, an "obscurity" of license plate region 120 refers to an extent to which the visibility, clarity, or legibility of license plate region 120 within plurality of vehicle images 118, is compromised or degraded. In some cases, obscurity 146 of license plate region may arise from various factors such as, without limitation, poor lighting conditions, motion blur, low image resolution, occlusions, or environmental elements like dirt, rain, snow, and/or the like. In an embodiment, computer vision module 144 may be configured to perform an image quality assessment on plurality of vehicle images 118; for instance, and without limitation, computer vision module 144 may analyze an overall quality of plurality of license plate regions isolated from plurality of vehicle images 118. In a non-limiting example, determining obscurity 146 of license plate region 120 may include computing a plurality of image quality metrics 148 and determining obscurity 146 of license plate region 120 as a function of the plurality of image quality metrics 148. "Image quality metrics," for the purpose of this disclosure, are quantitative measure used to evaluate the quality of a digital image such as vehicle image or license plate region by assessing various digital image characteristics. In some cases, digital image characteristics may include, without limitation, sharpness, contrast, brightness, noise level, artifacts, and/or the like. In a non-limiting example, image quality metrics 148 may include a Mean Squared Error (MSE), wherein the MSE measures an average squared difference between the pixel intensities of a reference license plate region and isolated license plate region 120. Reference license plate region may include a manual labeled license plate region or a license plate region with clear indicators; for instance, and without limitation, reference license plate region may include a high-quality license plate region that is free of obscurity, wherein such reference license plate region may be provided by the user via user device. Lower MSE values may indicate better image quality. In another non-limiting example, image quality metrics 148 may include a Peak Signal-to-Noise Ratio (PSNR), wherein the PSNR quantifies a ratio between the maximum possible pixel intensity value and the noise introduced by image processing or compression done by image processing module 126. Higher PSNR values may correspond to better image quality. In a further non-limiting example, image quality metrics 148 may include a Structural Similarity Index (SSIM), wherein the SSIM is a perceptual metric (range from −1 to 1) that may compare the structural, luminance, and contrast information between reference license plate region and isolated license plate region 120 to estimate a similarity of license plate region 120. Higher SSIM values may represent better image quality. Other exemplary embodiments of image quality metrices may include, without limitation, Universal Image Quality Index (UIQI), Visual Information Fidelity (VIF), and the like.

With further reference to FIG. 1, determining obscurity 146 of license plate region 120 as a function of plurality of image quality metrics 148 may further include setting a threshold value for each image quality metric of plurality of image quality metrics 148. In an embodiment, threshold value associated with each image quality metric may correspond to an acceptable level of obscurity 146 of license plate region 120. In a non-limiting example, computer vision module 144 may be configured to determine threshold value for each image quality metric of plurality of image quality metrices empirically or based on a set of criteria such as distance from at least an image capturing device 116, angle of view of plurality of image capturing device, lighting conditions, motion blur, license plate orientation, license plate obfuscation, license plate damaged and/or the like. Computer vision module 144 may each compare image quality metric of plurality of quality metrices 160 with threshold value. For example, and without limitation, if one or more of image quality metric values fall below (or above, depending on image quality metric) threshold value, computer vision module 144 may determine that license plate region 120 within vehicle image is obscured. Persons skilled in the art, upon reviewing the entirety of this disclosure, will be aware of various image quality metrices which may be computed and used by computer vision module 144 for determining obscurity 146 of license plate region 120.

Additionally, or alternatively, and continued referring to FIG. 1, computer vision module 144 may be configured to communicate with image processing module 126 and command image processing module 126 to apply additional image processing techniques 130 to license plate region 120 as a function of obscurity 146 of license plate region 120. In a non-limiting example, if plurality of image quality metrices 148 suggest obscurity, computer vision module 144 may configure image processing module 126 to apply additional image processing techniques such as image enhancement, denoising, contrast adjustment, and/or the like to improve the visibility and readability of license plate region. Further, determining obscurity 146 of license plate region 120 may include identifying missing or damaged areas of license plate region 120 based on obscurity 146 of license plate region 120. Computer vision module 144 may be also configured to communicate with an image inpainting module and command image inpainting module to apply image inpainting techniques to license plate region 120 as a function of the missing or damaged areas of license plate region 120 identified based on obscurity 146 of license plate region 120. Image inpainting module and image inpainting techniques are described in further detail below. In some cases, control module 124 may decide to discard vehicle image or license plate region 120 and require a new vehicle image or license plate region 120 with better quality.

With continued reference to FIG. 1, in other embodiments, obscurity 146 of license plate region 120 may be determined, by computer vision module 144, via an occlusion detection; for instance, and without limitation, computer vision module 144 may identify any occlusions or obstructions, such as dirt, mud, any objects that partially covering license plate region 120 using object detection algorithms such as, without limitation, Harr cascades, Viola-Jones, Histogram of Oriented Gradients (HOG), and the like. A motion blue estimation may also be used by computer vision module 144 for determination of obscurity 146 of license plate region 120. In a non-limiting example, computer vision module 144 may be configured to estimate an amount of motion blur (caused by the movement of the vehicle or at least an image capturing device 116) present in vehicle image or license plate region 120 through motion blur estimation algorithms such as, without limitation, Radon transform, Fouier-Mellin transform, Hough transform, and the like. Other exemplary methods for evaluating obscurity 146 of license plate region 120 may include, without limitation, visibility analysis, edge analysis, image segmentation confidence, and the like. Persons skilled in the art, upon reviewing the entirety of this disclosure, will be aware of various image analysis methods which may be incorporated by computer vision module 144 for determining obscurity 146 of license plate region 120.

With continued reference to FIG. 1, control module 124 includes an image inpainting module 150. As used in this disclosure, an "image inpainting module" is a component of control module 124 that specialized in the restoration, reconstruction, or completion of missing, corrupted, or damaged regions within visual data such as, without limitation, license plate region 120. "Image inpainting," for the purpose of this disclosure, refers to a process of filling in missing or damaged areas in a visually coherent and plausible manner, maintaining the overall structure, texture, and/or appearance of the digital image. Image inpainting module 150 may be operatively connected with image processing module 126 as described above. As used in this disclosure, "operatively connected" refers to a connection between two or more components in a way that the connected components can work together to achieve a specific function. In a non-limiting example, image inpainting module 150 is configured to reconstruct license plate region 120 as a function of obscurity 146 of license plate region 120 using an image inpainting technique 152. In some cases, plurality of license plate subregions 136 containing one or more potential indicators 140 may be reconstructed into indicators 138 using image inpainting module 150. In some cases, image inpainting technique 152 may be applied, by image processing module 126 operatively connected with image inpainting module 150, to license plate region 120 or one or more license plate sub-regions 136 with certain obscurity 146.

Still referring to FIG. 1, in an embodiment, image inpainting technique 152 may include a diffusion-based inpainting, wherein the diffusion-based inpainting is an image inpainting method that propagate image information from the surrounding areas into the missing regions by iteratively solving a partial differential equation (PDE) that models the image as a smooth function. In another embodiment, image inpainting technique 152 may include a patch-based inpainting, wherein the patch-based inpainting may search for similar patches in known image areas and fill in missing regions using those patches. In a non-limiting example, image inpainting module 150 may copy and blend a best-matching patches from surrounding areas of license plate region 120 or neighboring license plate sub-regions 136. In a further embodiment, image inpainting technique 152 may include a texture synthesis technique, wherein the texture synthesis technique may focus on generating one or more new texture patterns as a function of license plate region 120 or plurality of license plate sub-regions 136. In a non-limiting example, computer vision module 144 may analyze the local structure and statical properties of license plate region or plurality of license plate sub-region 140 and configure image inpainting module 150 to synthesize new texture samples that match with the observed structure and/or properties. Reconstructing license plate region 120 may include filling in missing regions identified by computer vision module 144 with synthesized texture.

With further reference to FIG. 1, in other embodiments, image inpainting technique 152 may include a learning-based image inpainting technique. As used in this disclosure, a "learning-based image inpainting technique" is an image inpainting technique that utilize machine-learning process to learn the underlying image structure (i.e., feature) and generate plausible content for missing regions based on the learned features. Machine-learning process may include a utilization of one or more neural networks as described in further detail below and with reference to FIGS. 5-6. A "feature," as described herein, is a distinctive or informative characteristic or pattern within an image that can be used to describe, represent, or otherwise differentiate objects, regions, or textures. In a non-limiting examples, features of license plate region 120 may include points, edges, corners, or more complex structures that capture the local or global information about the license plate. Features may be determined via a feature extraction, wherein the feature extraction is a process of identifying, computing, and representing features from raw image data such as, without limitation, original vehicle image or license plate region 120. In some cases, features may include local features, wherein the local features are features that capture the information about specific license plate sub-regions 136 or points/regions within license plate region 120. In a non-limiting example, image inpainting module 150 may include a Harris corner detector configured to detects corner points (i.e., distinctive and stable points) in license plate region 120 by analyzing the local intensity changes in two orthogonal directions. Other exemplary embodiments of local feature extraction may include, without limitation, scale-invariant feature transform (SIFT), speeded up robust features (SURF), and the like. In other cases, features may include global features, wherein the global features described overall characteristics of license plate region 120, capturing holistic information about plurality of indicators 138. In a non-limiting example, image inpainting module 150 may configure image processing module 126 to apply Gabor filters (i.e., a set of linear filters that capture the local frequency and orientation information in a given image) to license plate region 120. Image processing module 126 may convolve license plate region 120 at different scales and orientations. Global feature representation of license plate region 120 which is sensitive to texture and/or pattern changes may be obtained by image processing module 126 and transmitted to image inpainting module 150. Other exemplary embodiments of global feature extraction may include, without limitation, HOG, color histograms, and the like. In some cases, feature extraction may reduce the dimensionality of license plate region 120 while preserving the essential information such as plurality of indicators 138 for other processing steps.

With continued reference to FIG. 1, image inpainting module 150 may configure image processing module 126 to process license plate region 120 via interpolation and/or upsampling methods. For instance, and without limitation, image processing module 126 may convert a low pixel count image into a desired number of pixels needed for input into other components of control module 124 as described in further detail below. As a non-limiting example, a low pixel count image may have 100 pixels, however a number of pixels needed for image inpainting module 150 may be 124 pixels. Image processing module 126 may interpolate the low pixel count image to convert the 100 pixels into 124 pixels so that a resultant image may be input into the image inpainting module 150. In some instances, a set of interpolation rules may be trained by sets of highly detailed images and images that may have been downsampled to smaller numbers of pixels; for instance, and without limitation, downsampling, a neural network, or other machine learning model that is trained using the training sets of highly detailed images to predict interpolated pixel values in a license plate context. "Downsampling," also known as decimation, may include removing every Nth entry in a sequence of samples, all but every Nth entry, or the like, for the purpose of this disclosure, is a compression process performed by an N-sample compressor implemented using hardware or software. In some cases, anti-aliasing and/or anti-imaging filters, and/or low-pass filters, may be used to clean up side-effects of downsampling.

As a non-limiting example, and still referring to FIG. 1, license plate region 120 with sample-expanded pixels (e.g., pixels added between the original pixels) may be input to image inpainting module 150 containing a neural network or machine-learning model and output as pseudo replica license plate region with dummy values assigned to pixels between the original pixels based on a set of interpolation rules. In some instances, image inpainting module 150 and/or another machine-learning model described in this disclosure may have a set of interpolation rules trained by sets of highly detailed images and images that have been downsampled to smaller numbers of pixels, and a neural network or other machine learning model that is trained using those examples to predict interpolated pixel values in a license plate context. In a non-limiting example, image inpainting module 150 may run license plate region 120 with sample-expanded pixels (the ones added between the original pixels, with dummy values) through a neural network, wherein the neural network may fill in values to replace the dummy values based on the rules. It should be noted that one of ordinary skill in the art, upon reading this disclosure, would know the various methods to interpolate a low pixel count image to a desired number of pixels required by image inpainting module 150.

Still referring to FIG. 1, image processing module 126 may utilize sample expander methods, a low-pass filter, or both. As used in this disclosure, a "low-pass filter" is a low-pass filter is a filter that passes signals with a frequency lower than a selected cutoff frequency and attenuates signals with frequencies higher than the cutoff frequency. The exact frequency response of the filter depends on the filter design. In some embodiments, image inpainting module 150 may configure image processing module 126 to fill in pixels in between original image pixels through luma or chroma averaging. Image processing module 126 may down-sample license plate region 120 to a lower number of pixels to input into image inpainting module 150. As a non-limiting example, a high pixel count image may have 256 pixels, however a number of pixels needed for image inpainting module 150 may be 124 pixels. Image processing module 126 may down-sample the high pixel count image to convert the 256 pixels into 124 pixels so that a resultant image may be input into an image inpainting module 150.

With continued reference to FIG. 1, in some cases, image inpainting module 150 may include Convolutional Neural Networks (CNNs). As used in this disclosure, a "convolutional neural network" is a type of artificial neural network used that uses convolution in place of general matrix multiplication in at least one layer. In an embodiment, CNN may include a plurality of layers, including convolutional layers, activation layers, pooling layers, and fully connected layers. Plurality of layers may work together to learn and extract features from the input data such as, without limitation, license plate region 120 or plurality of license plate sub-regions 136, thereby enabling image inpainting module 150 and/or computer vision module 144 to recognize complex patterns and perform various processing steps as described in this disclosure. In a non-limiting example, convolutional layer may apply a set of learnable filters (i.e., convolutional kernels) to license plate region 120 through a sliding window operation, resulting in a set of feature maps. Each filter may be responsible for detecting a specific feature at different spatial locations in license plate region 120. CNN may include one or more activation layers, wherein the activation layers may introduce non-linearity into the network by applying an activation function, such as, without limitation, a Rectified Linear Unit (ReLU), to the output of convolutional layer. In some cases, such non-linearity may help CNN to learn and represent more complex relationships and patterns in license plate region 120. CNN may include one or more pooling layer configured to reduce the spatial dimensions of the feature maps by applying downsampling as described above, such as max-pooling or average pooling, to small, non-overlapping regions of the feature maps. Downsampling may reduce the computational complexity of the network, improve its generalization capabilities, and provides a form of translation invariance. CNN may include one or more fully Connected layers, wherein the fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, a reconstructed license plate region. Additionally, or alternatively, CNN may include a SoftMax Layer for potential classification tasks, wherein the SoftMax layer may be often added at the end of CNN to convert the output of the fully connected layer into one or more probability values for a plurality of categories. In some cases, SoftMax layer may include a SoftMax function configured to normalize the output such that the sum of the probabilities equals one.

With continued reference to FIG. 1, image inpainting module 150 may include a Generative Adversarial Network (GAN). As used in this disclosure, a "generative adversarial network" is a type of artificial neural network with two neural networks, a generator and a discriminator, that compete against each other in a process that ultimately results in the generator learning to create relevant images such as, without limitation, missing or damaged parts of license plate region 120. In an embodiment, GAN may include a generator network that takes license plate region 120 with damaged and/or missing part and generates a reconstructed license plate region. GAN may include a discriminator network that evaluates the realism of the reconstructed license plate region by comparing them to reference license plate region such as a real, complete license plate image. Discriminator network may be trained to distinguish between real and generated license plate regions. Generator network may be trained to create more license plate reconstructions based on the feedback from discriminator network. Such adversarial process may continue until generator network is capable of creating highly realistic license plate region that discriminator network can no longer distinguish from reference license plate region. In a non-limiting example, given an input license plate region 120 with a partially occluded, damaged, or low-contrast license plate, determined by computer vision module 144, generator network of GAN may create a reconstructed license plate region that is visually coherent and plausible, filling in the missing or damaged parts based on the learned patterns and structures of license plate.

With continued reference to FIG. 1, image inpainting module 150 may include an autoencoder. As used in this disclosure, an "autoencoder" is a type of artificial neural network used for unsupervised learning of data reconstruction. In some cases, autoencoder may be able to learn a plurality of features of input license plate region 120 by encoding input license plate region 120 into a lower-dimensional space and then decoding it back to its original form, minimizing the reconstruction error. In an embodiment, autoencoder may include an encoder and a decoder. In a non-limiting example, encoder and decoder may each include a feedforward neural networks, though more complex architectures such as CNNs as described above, may also be employed depending obscurity 146 of license plate region 120. Encoder may accept a license plate region and transform the license plate region into a lower-dimensional representation such as a latent space or a code, while decoder may accept the lower-dimensional representation generated by encoder and reconstructs the license plate region. Autoencoder may learn to minimize reconstruction error between the input license plate region and reconstructed license plate region during training. In a non-limiting example, image inpainting module 150 may use a loss function such as the mean squared error (MSE) or cross-entropy loss to minimize reconstruction error. In a non-limiting example, autoencoder may include a generative autoencoder such as a Variational autoencoders (VAEs) for generating reconstructed license plate region that resemble license plate region 120.

With continued reference to FIG. 1, machine-learning models, such as, without limitation, CNN, GAN, autoencoder, and/or the like used by image inpainting module 150 for reconstructing license plate region may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from data store 142, such as any databases as described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data gathered in standardized forms by persons or processes, such that entry of a given data element in a given field in a form may be mapped to one or more descriptors of categories. Elements in training data may be linked to descriptors of categories by tags, tokens, or other data elements. Machine learning model may be trained by correlated inputs and outputs of training data. Training data may be data sets that have already been converted from raw data whether manually, by machine, or any other method.

With continued reference to FIG. 1, image inpainting module 150 containing machine-learning models as listed above may be trained using license plate reconstruction training data. License plate reconstruction training data may include a collection of labeled/unlabeled license plate regions. In a non-limiting example, license plate reconstruction training data may include a plurality of license plate regions as input correlated to a plurality of complete license plate regions as output. In this case, input license plate regions may include damaged, occluded, or low-contrast license plate regions. Complete license plate regions may include license plate region or plurality of segmented license plate sub-regions with complete, readable indicators 138.

With continued reference to FIG. 1, computer vision module 144 of control module 124 is configured to identify plurality of indicators 138 as a function of license plate region 120 (or plurality of license plate sub-regions 136). Plurality of indicators may include any indicators as described above in this disclosure. In some cases, license plate region 120 may be a processed and/or reconstructed license plate region. In a non-limiting example, control module 124 may configured image inpainting module 150 to reconstruct license plate region 120 and/or plurality of license plate sub-regions 136 isolated/segmented by image processing module 126 depending on obscurity 146 of license plate region 120 of plurality of obscurities of plurality of license plate sub-regions 136. Image inpainting module 150 may be configured to reconstruct license plate region 120 and/or plurality of license plate sub-regions 136 if they are obscured prior to identifying plurality of indicators 138. In an embodiment, identifying plurality of indicators 138 may include identifying plurality of indicators 138 using optical character recognition (OCR) 154. As used in this disclosure, "optical character recognition" is a process of automatic conversion of images of texts (e.g., plurality of indicators 138 within license plate region 120) into machine-encoded text. In some cases, recognition of at least a keyword from an image component may include one or more processes, including without limitation ORC 154, optical word recognition, intelligent character recognition, intelligent word recognition, and the like. In some cases, ORC 154 may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases ORC 154 may be an "offline" process, which analyses a static document or image frame. In some cases, handwriting movement analysis can be used as input to license plate indicator recognition. For example, instead of merely using shapes of glyphs and words, this technique may capture motions, such as the order in which segments are drawn, the direction, and the pattern of putting the pen down and lifting it. This additional information can make license plate indicator recognition more accurate. In some cases, this technology may be referred to as "online" character recognition, dynamic character recognition, real-time character recognition, and intelligent character recognition.

Still referring to FIG. 1, in some cases, ORC 154 processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed ORC 154 algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate ORC 154 algorithm to be selected. In some cases, a character isolation or "segmentation" process may separate signal characters, for example character-based ORC 154 algorithms. In some cases, a normalization process may normalize aspect ratio and/or scale of image component.

Still referring to FIG. 1, in some embodiments an ORC 154 process will include an ORC 154 algorithm. Exemplary ORC 154 algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an ORC 154 process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of ORC 154. In some embodiments, machine-learning process like nearest neighbor classifiers (e.g., k-nearest neighbors algorithm) can be used to compare image features with stored glyph features and choose a nearest match. ORC 154 may employ any machine-learning process described in this disclosure, for example machine-learning processes described with reference to FIGS. 4-6. Exemplary non-limiting ORC 154 software includes Cuneiform and Tesseract. Cuneiform is a multi-language, open-source optical character recognition system originally developed by Cognitive Technologies of Moscow, Russia. Tesseract is free ORC 154 software originally developed by Hewlett-Packard of Palo Alto, California, United States.

Still referring to FIG. 1, in some cases, ORC 154 may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary ORC 154 software tool include ORC 154 opus. ORC 154 opus development is led by German Research Centre for Artificial Intelligence in Kaiserslautern, Germany. In some cases, ORC 154 software may employ neural networks, for example neural networks as taught in reference to FIGS. 5-6.

Still referring to FIG. 1, in some cases, ORC 154 may include post-processing. For example, ORC 154 accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an ORC 154 process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an ORC 154 process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in ORC 154 post-processing to further optimize results.

With continued reference to FIG. 1, in some embodiments, identifying plurality of indicator 138 may include extracting a plurality of indicator features 156 as a function of license plate region 120. As used in this disclosure, an "indicator feature" is a feature of indicator 138. In an embodiment, indicator feature may include a specific characteristic or pattern of indicator 138 within license plate region 120 that can be used to identify, segment, or otherwise recognize indicator 138. Plurality of indicator features 156 may be extracted via any feature extraction as described above in this disclosure. In a non-limiting example, control module 124 may be configured to generate an indicator classifier 158 using indicator training data, wherein the indicator training data may include a plurality of indicator features 156 as input correlated to a plurality of indicators 138 as output and identify plurality of indicators 138 as a function of license plate region 120 using indicator classifier 158. A "classifier," as used in this disclosure is a machine-learning model, such as a mathematical model, neural network, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Control module 124 and/or another device may generate a classifier using a classification algorithm, defined as a processes whereby control module 124 derives a classifier from training data. Classification of plurality of indicators 138 may be performed using, without limitation, image classifiers such as without limitation, logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, CNNS, and/or neural network-based classifiers.

Still referring to FIG. 1, control module 124 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Control module 124 may then calculate a likelihood table by calculating probabilities of different data entries and classification labels. Control module 124 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, control module 124 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, plurality of indicators 138 identified from license plate region 120 may be stored in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement a ledger, where data entries that have been posted to the immutable sequential listing cannot be altered. An immutable sequential listing may include a directed acyclic graph. As used in this disclosure, a "ledger" is a digital immutable ledger where data entries may be posted and cannot be altered. Ledger may be distributed across some or all nodes on network, such as a peer-to-peer network, whereby each node replicates and saves an identical copy of ledger and updates itself independently. In a non-limiting example, an immutable sequential listing may include a blockchain. Control module 124 may be configured to post plurality of indicators 138 associated with user's vehicle on the blockchain.

With continued reference to FIG. 1, control module 124 may further include a validation module 158 configured to validate plurality of indicators 138 as a function of plurality of reference indicators 110. As used in this disclosure, a "validation module" is a component responsible for validating and/or verifying a given credential, a certification, or otherwise an entitlement. As used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation, plurality of indicators 138, against a specification, for example without limitation, plurality of reference indicators 110. In some cases, validation module 158 may be additionally configured to validate a product by validating constituent sub-products. In some embodiments, validation module 158 may be configured to validate any product or data, for example without limitation, plurality of indicators 138. In some cases, at least a machine-learning process, for example a machine-learning model, may be used to validate by validation module 158. Validation module 158 may use any machine-learning process described in this disclosure for this or any other function.

Still referring to FIG. 1, validating plurality of indicators 138 may include confirming license plate region 120 of user's car captured by plurality of image capturing device is valid, genuine, unexpired, and/or grants the appropriate access or entitlements. In some cases, validating plurality of indicators 138 may include matching plurality of indicators 138 to plurality of reference indicators 110. Plurality of reference indicators 110 may be retrieved, by validation module 158, through querying data store 142 as described above. Validation module 158 may be configured to iterate plurality of indicators 138 and compare each indicator of plurality of indicators to corresponding reference indicator within plurality of reference indicators 110. Additionally, or alternatively, validating plurality of indicators 138 may include checking the pattern, design, and/or style of plurality of indicators 138 consistent with the pattern, design, and/or style of plurality of reference indicators 110. In a non-limiting example, plurality of indicators 138 on a MA license plate may be invalid if such plurality of indicators 138 is compared against plurality of reference indicators on a TX license plate, even the content (e.g., characters such as letters, numbers, and/or special characters) are matched. Validation module 158 is then configured to grant user 106 at least a right 114 associated with plurality of reference indicators 110 as a function of validation of plurality of indicators 138. In some cases, user 106 may be granted at least a right 114 upon a successful validation (i.e., plurality of indicators 138 matches with plurality of reference indicators 110). In other cases, at least a right 114 may not be granted to user 106 if validation module 158 failed to validate plurality of indicators 138 (plurality of indicators 138 differs from plurality of reference indicators 110).

With further reference to FIG. 1, validating license plate region 120 may further include identifying a first set of indicators as a function of first vehicle image. First vehicle image may be captured, by at least an image capturing device 116, at front portion of the vehicle; for instance, and without limitation, first vehicle image may include a front license plate region, wherein first set of indicators may include plurality of indicators 138 of the front license plate region. Validating license plate region 120 may include identifying a second set of indicators as a function of a second vehicle image. Second vehicle image may be captured at rear portion of the vehicle; for instance, and without limitation, second vehicle image may include a rear license plate region, wherein second set of indicators may include plurality of indicators 138 of the rear license plate region. Validation module 158 may then generate a validation datum 160 as a function of a comparison between first set of indicators and second set of indicators. A "validation datum," for the purpose of this disclosure, is a unique identifier or proof of authenticity that can be used to confirm user's identity, access rights, or entitlements within vehicle service site. In a non-limiting example, validation module 158 may be configured to validate license plate (or license plate region) is indeed associated with the correct user by matching first set of indicators and second set of indicators, and/or both set of indicators with plurality of indicators 138 on file (i.e., immutable sequential listing). Validation module 158 may be configured to generate validation datum 160 as a function of the license plate region validation, wherein control module 124 may restrict user from accessing certain rights as listed above, if validation datum 160 indicates an unsuccessful license plate region validation. Such restriction may be applied to the user until a validation datum indicating a successful license plate region validation is generated by validation module 158 and recognized by control module 124.

Figure 2A:
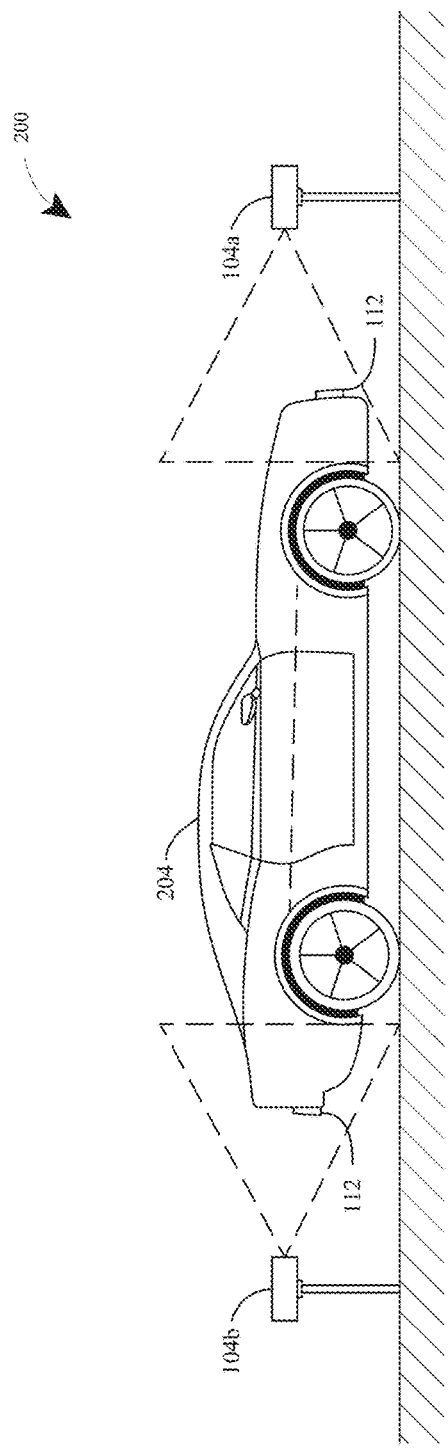
FIG. 2A is a diagram of an exemplary embodiment of a preparation zone with a plurality of image capturing devices.
Figure 2B:
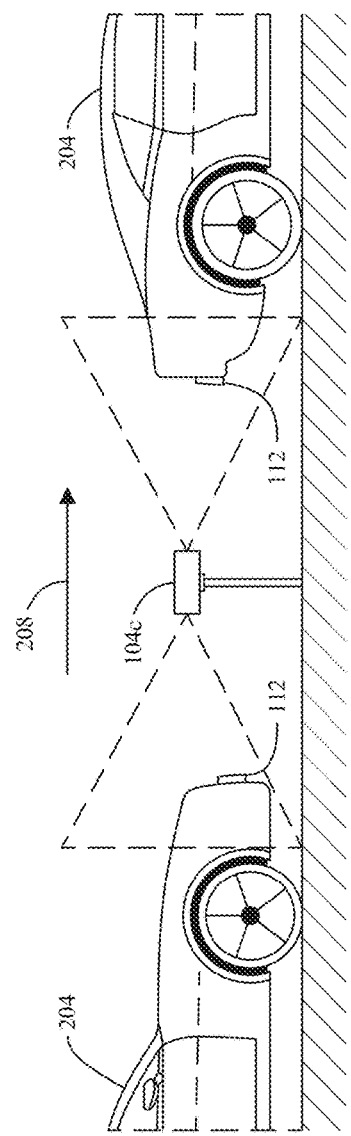
FIG. 2B is a diagram of an exemplary embodiment of a preparation zone with a singular image capturing device.

Referring now to FIGS. 2A-B, exemplary embodiments of preparation zone 200 are illustrated. In an embodiment, preparation zone 200 may include at least an image capturing device 116. At least an image capturing device may include any image capturing device as described in this disclosure. At least an image capturing device 116 may be triggered, by control module 124, to capture plurality of vehicle images 118 containing license plate region 120. In a non-limiting example, control module 124 may be commutative connected to at least a sensor device, such as a weight sensor configured to initiate the capture of plurality of vehicle images 118, wherein the weight sensor is a type of sensor device used to measure the weight or mass of vehicle 204. Vehicle 208 may exert a force downward (i.e., weight) when vehicle 208 stops on and/or passes over the weight sensor disposed below the ground of preparation zone 200. Control module 124 may active at least an image capturing device 116 when vehicle 204 is present; for instance, and without limitation, at least an image capturing device 116 may be configured to capture plurality of vehicle images 118 when a certain weight threshold is exceeded. In another non-limiting example, control module 124 may utilize a motion detection to initiate the capture of plurality of vehicle images 118, wherein the motion detection is a computer vision technique (performed by computer vision module 144) used to identify and tract movement in a video sequence or live stream. For example, and without limitation, computer vision module 144 may be configured to analyze consecutive frames of a video feed taken by at least an image capturing device 116 to detect changes or movement within the scene. Control module 124 may trigger at least an image capturing device 116 to capture plurality of vehicle images 118 when a significant change indicating a presence of a moving vehicle 204 is detected. Other exemplary embodiments of motion detection may include, without limitation, infrared motion detection, inductive loop detection, and the like.

Referring now to FIG. 2A, an exemplary embodiment of preparation zone 200 with plurality of image capturing devices 116*a-b* is illustrated. Plurality of image capturing devices 116*a-b* depicted is capturing for license plate region 120 of the vehicle 204. In an embodiment, license plate region 112 may contain plurality of indicators 138, wherein the plurality of indicators 138 may be used to validate of the user's identity or the vehicles identity. Vehicle 204 may include any means by which someone or something may be transported. As a non-limiting example, vehicle 204 may include a car, SUV, sedan, hatchback, sports car, ATV, go cart, truck, bus, motorcycle, bicycle, watercraft, aircraft, snowcraft, and the like. In some cases, vehicle 204 may be configured to have a plurality of license plate regions that are associated with it. In a non-limiting example, vehicle 204 may be configured to have two license plate regions: a front and a rear license plate region.

With continued reference to FIG. 2A, plurality of image capturing devices 116*a-b* may be positioned on opposite sides of preparation zone 200. In a non-limiting example, plurality of image capturing devices 116*a-b* may include a first image capturing device 116*a* positioned in front of vehicle 204 at certain distance. Plurality of image capturing devices 116*a-b* may include a second image capturing device 116*b* positioned opposite to first image capturing device 116*a*; for instance, and without limitation, at certain distance behind vehicle 204. Additionally, or alternatively, plurality of image capturing device 116*a-b* may be mounted in an elevated position (i.e., certain distance above the ground).

Now referring to FIG. 2B, an exemplary embodiment of preparation zone 200 with a singular image capturing device 116*c* is illustrated. Singular image capturing device may be located at the center of preparation zone 200 and may not cause any interference to the passing vehicle 204. In some embodiments, singular image capturing device 116*c* may be rotatably mounted. As used in the current disclosure, "rotatably mounted" is being securely mounted in a location while allowing for rotation along at least one axis. In a non-limiting example, singular image capturing device 116*c* may rotate from one side to another side, configured to capture a plurality of vehicle images 118 containing at least a vehicle image with license plate region 120 while vehicle 204 in a vehicle movement 208.

Figure 3:
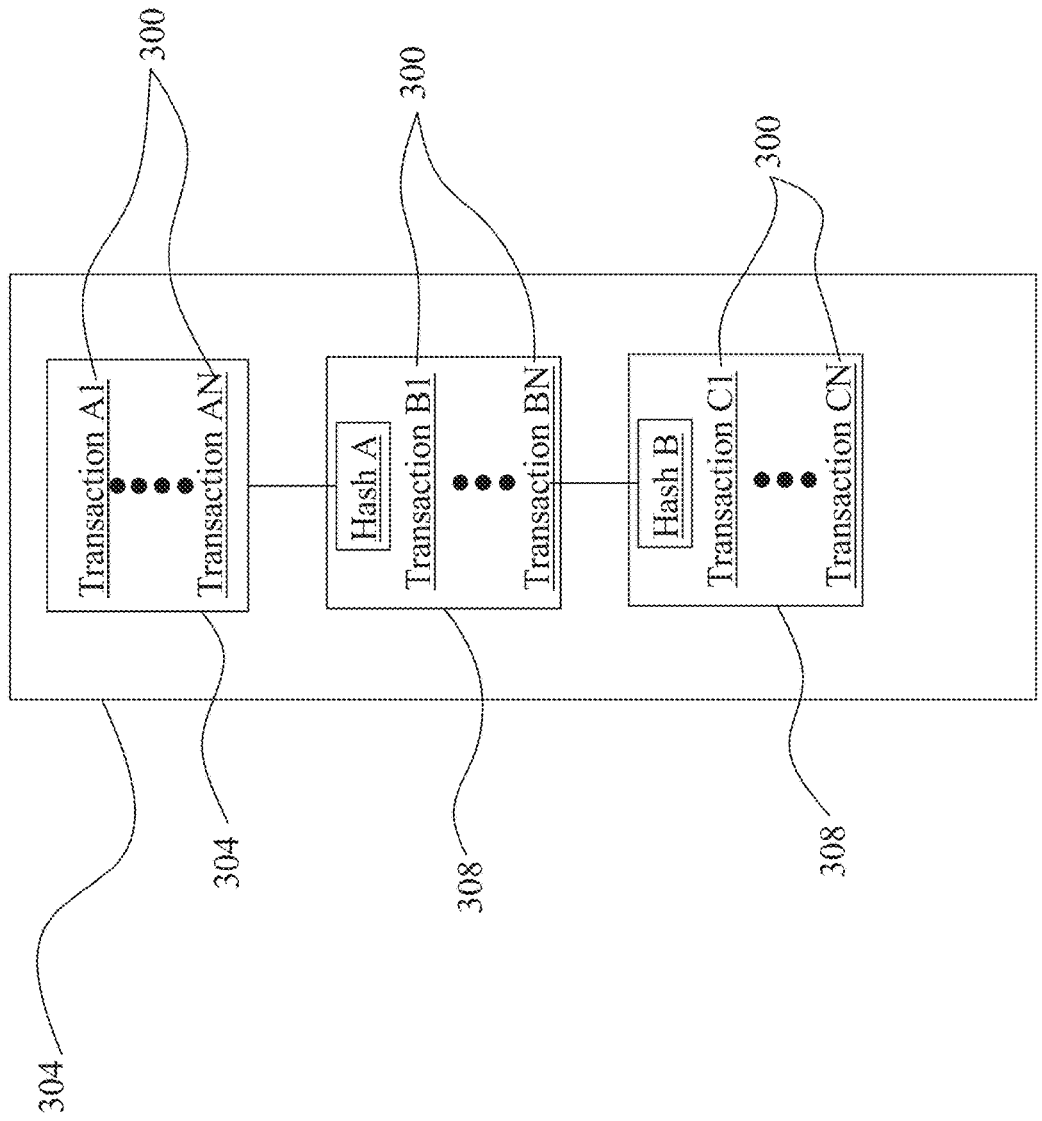
FIG. 3 is a block diagram of an exemplary immutable sequential listing.

Referring now to FIG. 3, an exemplary embodiment of an immutable sequential listing 300 is illustrated. Data elements are listed in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto-currency to the miners. Quantities of crypto-currency may be exchanged using at least a posted content as described above.

Figure 4:
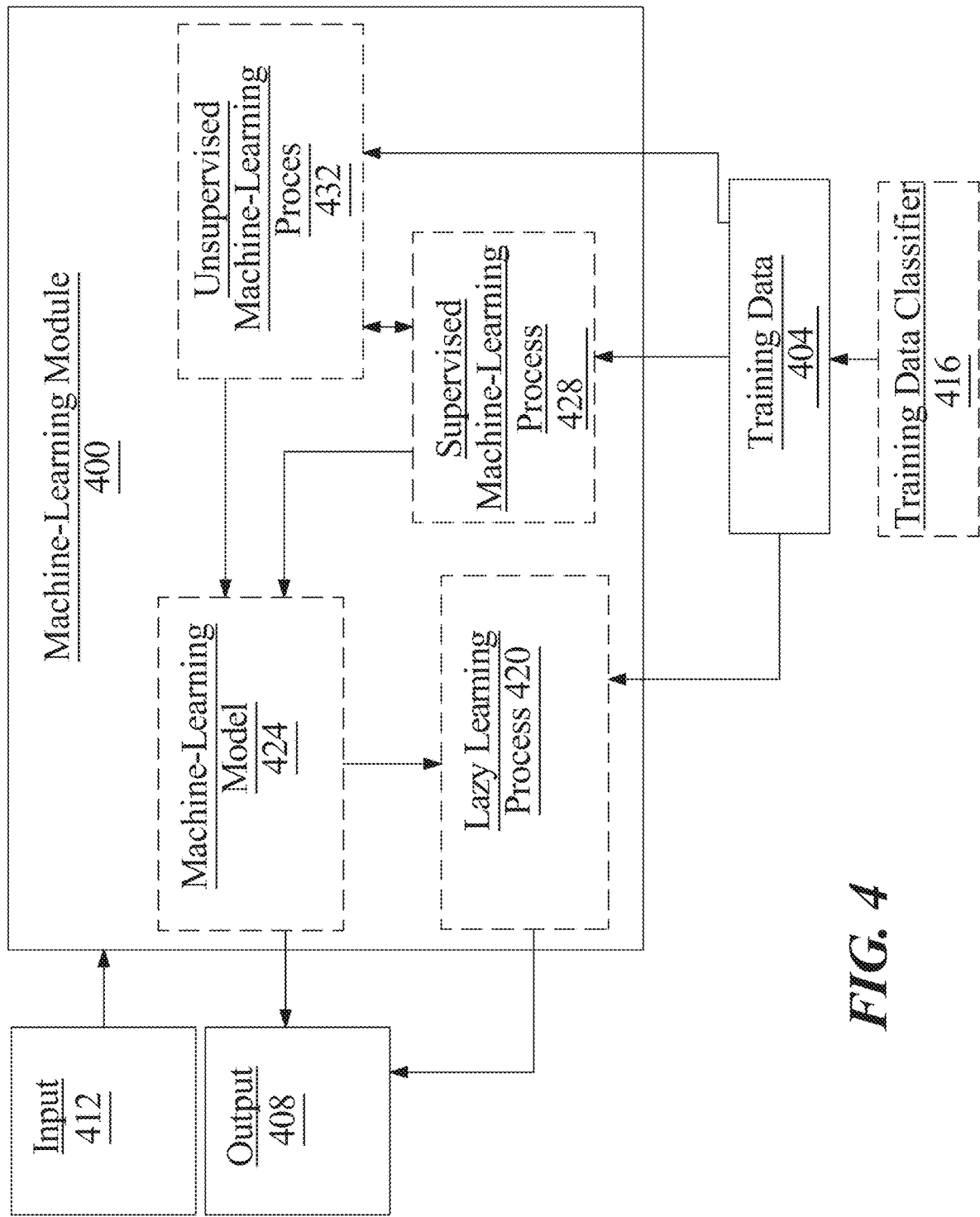
FIG. 4 is a block diagram of an exemplary embodiment of a machine learning module.

Referring now to FIG. 4, an exemplary embodiment of a machine-learning module 400 that may perform one or more machine-learning processes, as described in this disclosure, is illustrated. Machine-learning module may perform determinations, classification, and/or analysis steps, methods, processes, or the like as described in this disclosure using machine learning processes. Machine-learning process may use training data 404 to generate an algorithm that will be performed by control module 124 to produce outputs 408 given data provided as inputs 412; this is in contrast to a non-machine learning software program where the commands to be executed are determined in advance by a user and written in a programming language. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data elements may tend to correlate to a higher value of a second data element belonging to a second category of data elements, indicating a possible proportional or other mathematical relationship linking values belonging to the two categories. Multiple categories of data elements may be related in training data 404, according to various correlations; correlations may indicate causative and/or predictive links between categories of data elements, which may be modeled as relationships, such as mathematical relationships, by machine-learning processes, as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length format, formats linking positions of data to categories such as comma-separated value (CSV) formats and/or self-describing formats, such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include plurality of license plate region as described above as inputs, plurality of indicators as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
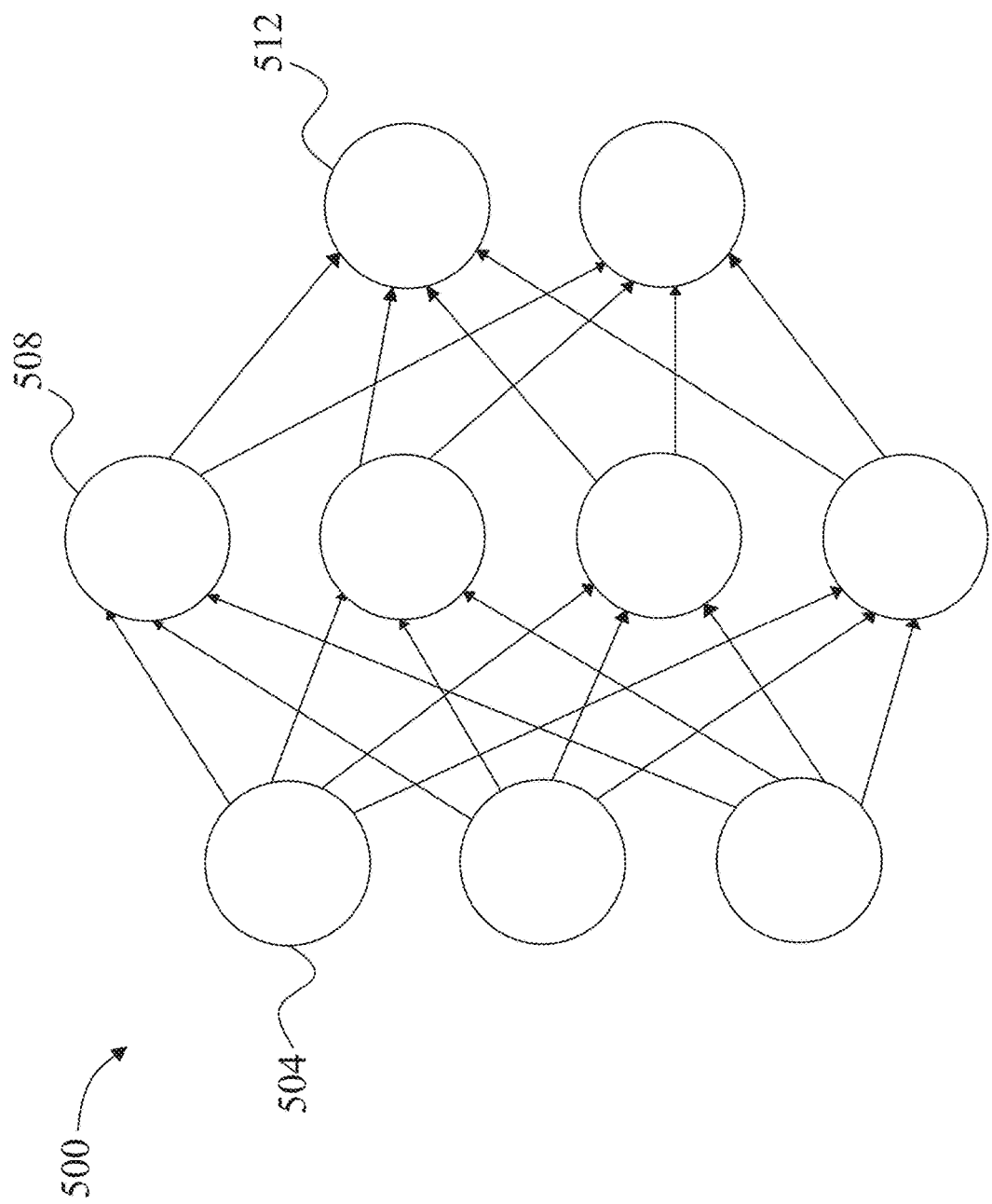
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
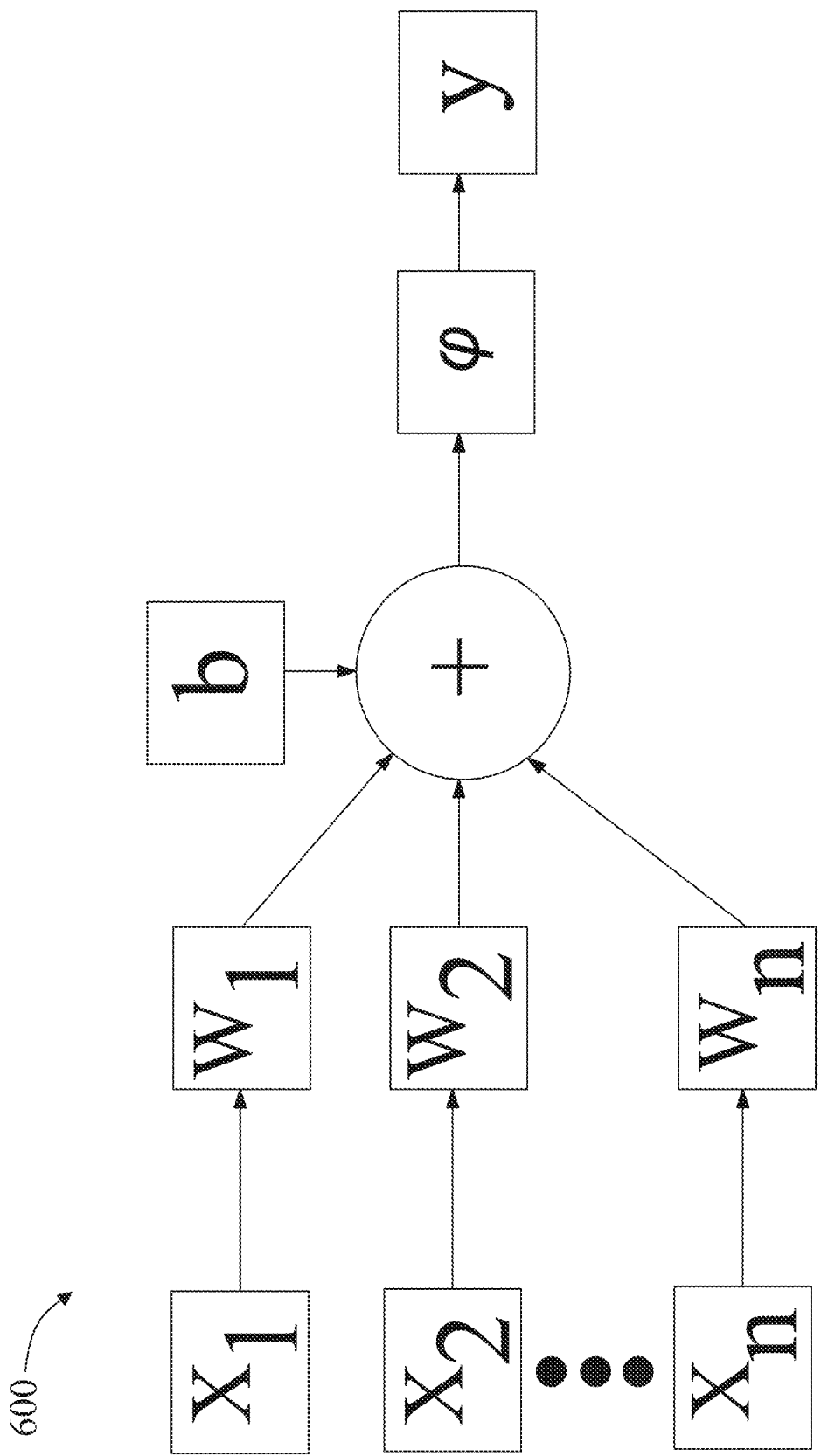
FIG. 6 is a block diagram of an exemplary embodiment of a node.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w'_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
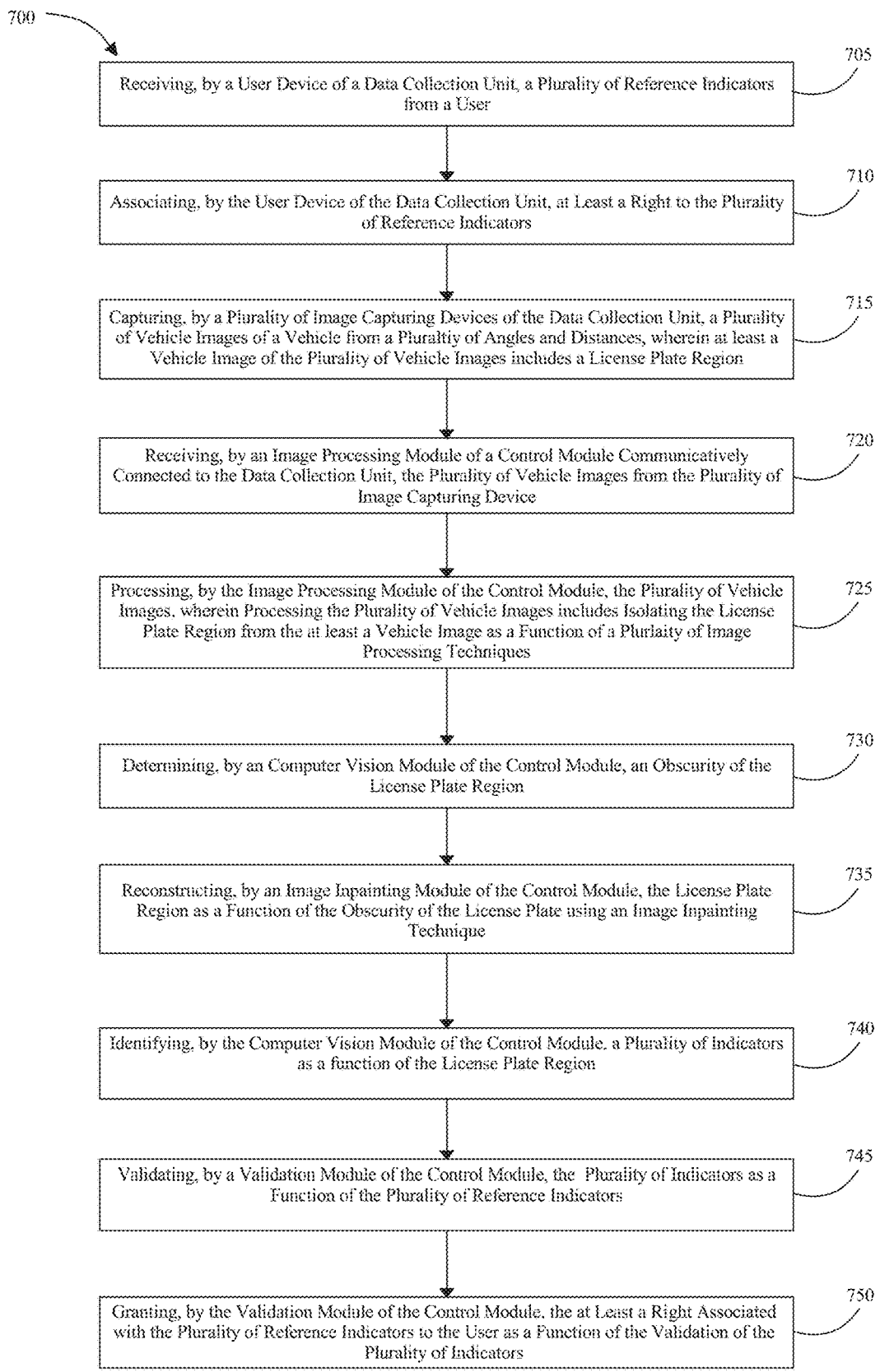
FIG. 7 is a flow diagram of an exemplary method for providing a dynamic user experience in a vehicle care.

Now referring to FIG. 7, a flow diagram of an exemplary method 700 for automatic license plate recognition of a vehicle is illustrated. Method 700 includes a step 705 of receiving, by a user device of a data collection unit, a plurality of reference indicators from a user. This may be implemented, without limitation, as described above with reference to FIGS. 1-6.

With continued reference to FIG. 7, method 700 includes a step 710 of associating, by the user device of the data collection unit, at least a right to the plurality of reference indicators. This may be implemented, without limitation, as described above with reference to FIGS. 1-6.

With continued reference to FIG. 7, method 700 includes a step 715 of capturing, by at least an image capturing device, a plurality of vehicle images of a vehicle from a plurality of angles and distances, wherein at least a vehicle image of the plurality of vehicle images includes a license plate region. In some embodiments, capturing the plurality of vehicle images may include capturing, by at least an image capturing device, a first vehicle image including a first license plate region, capturing, by the at least an image capturing device, a second vehicle image including a second license plate region, wherein the first vehicle image may be captured at the front portion of the vehicle and the second vehicle image may be captured at the rear portion of the vehicle. This may be implemented, without limitation, as described above with reference to FIGS. 1-6.

With continued reference to FIG. 7, method 700 includes a step 720 of receiving, by an image processing module of a control module communicatively connected to the at least an image capturing device, the plurality of vehicle images from the at least an image capturing device. This may be implemented, without limitation, as described above with reference to FIGS. 1-6.

With continued reference to FIG. 7, method 700 includes a step 725 of processing, by the image processing module of the control module, the plurality of vehicle images, wherein processing the plurality of vehicle images includes isolating the license plate region from the at least a vehicle image as a function of a plurality of image processing techniques. In some embodiments, processing the plurality of vehicle images may include determining a degree of quality of depiction of the license plate region for each vehicle image of the plurality of vehicle images, ranking the plurality of vehicle images according to the degree of quality of depiction of the license plate region, and selecting a highest-ranking vehicle image from the plurality of vehicle images. In some embodiments, isolating the license plate region from the at least a vehicle image may include determining a region of interest (ROI) as a function of a plurality of license plate parameters identified via an edge processing and isolating the license plate region from the at least a vehicle image based on the ROI. In some embodiments, isolating the license plate region from the at least a vehicle image may include segmenting the license plate region into a plurality of license plate sub-regions, wherein each license plate sub-regions of the plurality of license plate sub-regions comprises at least an indicator. This may be implemented, without limitation, as described above with reference to FIGS. 1-6.

With continued reference to FIG. 7, method 700 includes a step 730 of determining, by a computer vision module of the control module, an obscurity of the license plate region. In some embodiments, determining the obscurity of the license plate region may include computing a plurality of image quality metrices of the license plate region. This may be implemented, without limitation, as described above with reference to FIGS. 1-6.

With continued reference to FIG. 7, method 700 includes a step 735 reconstructing, by an image inpainting module operatively connected to the image processing module of the control module, the license plate region as a function of the obscurity of the license plate using an image inpainting technique. In some embodiments, the image inpainting technique may include a learning-based image inpainting technique. This may be implemented, without limitation, as described above with reference to FIGS. 1-6.

With continued reference to FIG. 7, method 700 includes a step 740 of identifying, by the computer vision module of the control module, a plurality of indicators as a function of the license plate region. In some embodiments, identifying the plurality of indicators comprises identifying the plurality of indicators using optical character recognition (OCR). In some embodiments, identifying the plurality of indicator may include extract a plurality of indicator features as a function of the license plate region, generate an indicator classifier using indicator training data, wherein the indicator training data may include a plurality of indicator features as input correlated to a plurality of indicators as output, and identify the plurality of indicator as a function of the license plate region using the indicator classifier. This may be implemented, without limitation, as described above with reference to FIGS. 1-6.

With continued reference to FIG. 7 method 700 includes a step 745 of validating, by a validation module of the control module, the plurality of indicators as a function of the plurality of reference indicators. In some embodiments, validating the plurality of indicators may include identifying a first set of indicators as a function of the first vehicle image, identifying a second set of indicators as a function of the second vehicle image, and generating a validation datum as a function of a comparison between the first set of indicators and the second set of indicators. This may be implemented, without limitation, as described above with reference to FIGS. 1-6. This may be implemented, without limitation, as described above with reference to FIGS. 1-6.

With continued reference to FIG. 7, method 700 includes a step 750 of granting, by the validation module of the control module, the at least a right associated with the plurality of reference indicators to the user as a function of the validation of the plurality of indicators. This may be implemented, without limitation, as described above with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
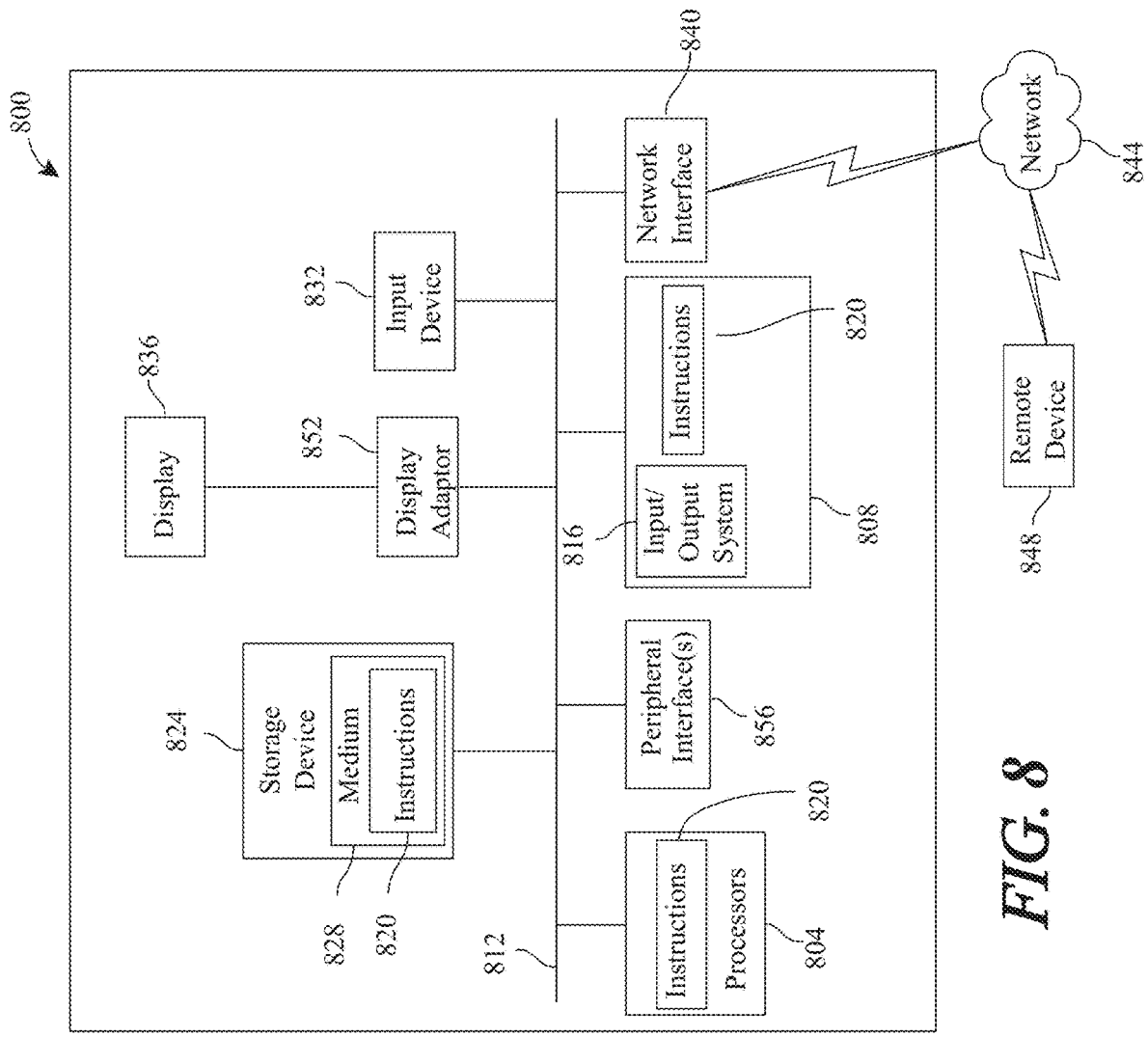
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automatic license plate recognition of a vehicle, the apparatus comprises:
    a data collection unit, wherein the data collection unit comprises:
        a user device configured to:
            receive a user input from a user, wherein the user input comprises a plurality of reference indicators; and
            associate at least a right to the plurality of reference indicators, wherein the right is determined based on a membership status of the user, and wherein the right enables the user to access one or more services within a vehicle service site; and
        at least an image capturing device configured to:
            capture a plurality of vehicle images of a vehicle from a plurality of angles and distances, wherein at least a vehicle image of the plurality of vehicle images comprises a license plate region; and
    a control module communicatively connected to the data collection unit, wherein the control module comprises:
        an image processing module, wherein the image processing module is configured to:
            receive the plurality of vehicle images from the at least an image capturing device, wherein receiving the plurality of vehicle images further comprises retrieving the plurality of vehicle images from a data store using a query; and
            process the plurality of vehicle images, wherein processing the plurality of vehicle images comprises:
                isolating the license plate region from the at least a vehicle image as a function of a plurality of image processing techniques; and
                removing a redundancy in each vehicle image within the plurality of vehicle images;
        a computer vision module, wherein the computer vision module is configured to:
            determine an obscurity of the license plate region; and
            identify a plurality of indicators as a function of the license plate region;
        an image inpainting module operatively connected to the image processing module, wherein the image inpainting module is configured to:
            reconstruct the license plate region as a function of the obscurity of the license plate using an image inpainting technique, wherein the image inpainting technique is configured to:
                input the license plate region to the image inpainting module, wherein the image inpainting module comprises at least one interpolation rule trained by a plurality of images to predict interpolated pixel values in a license plate context, wherein the plurality of images are downsampled to smaller numbers of pixels; and
        a validation module configured to:
            validate the plurality of indicators as a function of the plurality of reference indicators; and
            grant the user the at least a right associated to the plurality of reference indicators to the user as a function of the validation of the plurality of indicators.

2. The apparatus of claim 1, wherein processing the plurality of vehicle images comprises:
    determining a degree of quality of depiction of the license plate region for each vehicle image of the plurality of vehicle images;
    ranking the plurality of vehicle images according to the degree of quality of depiction of the license plate region; and
    selecting a highest-ranking vehicle image from the plurality of vehicle images.

3. The apparatus of claim 1, wherein isolating the license plate region from the at least a vehicle image comprises:
  determining a region of interest (ROI) as a function of a plurality of license plate parameters identified using an edge detection technique; and
  isolating the license plate region from the at least a vehicle image based on the ROI.

4. The apparatus of claim 1, wherein isolating the license plate region from the at least a vehicle image comprises:
  segmenting the license plate region into a plurality of license plate sub-regions, wherein each license plate sub-regions of the plurality of license plate sub-regions comprises at least an indicator.

5. The apparatus of claim 1, wherein determining the obscurity of the license plate region comprises computing a plurality of image quality metrices of the license plate region.

6. The apparatus of claim 1, wherein identifying the plurality of indicators comprises identifying the plurality of indicators using optical character recognition (OCR).

7. The apparatus of claim 1, wherein identifying the plurality of indicator comprises:
  extracting a plurality of indicator features as a function of the license plate region;
  generating an indicator classifier using indicator training data, wherein the indicator training data comprises a plurality of indicator features as input correlated to a plurality of indicators as output; and
  identifying the plurality of indicator as a function of the license plate region using the indicator classifier.

8. The apparatus of claim 1, wherein the image inpainting technique comprises a learning-based image inpainting technique.

9. The apparatus of claim 1, wherein the apparatus further comprises at least a sensor device communicatively connected to a control module, wherein the at least a sensor device comprises a weight sensor, wherein the weight sensor is configured to initiate the capture of the plurality of vehicle images of the vehicle.

10. The apparatus of claim 9, wherein receiving the plurality of vehicle images further comprises:
  generating an image capture parameter;
  transmitting a command to the at least an image capturing device to take at least a vehicle image of the plurality of vehicle images with the image capture parameter;
  comparing the weight of the vehicle with a weight threshold; and
  activating the at least an image capturing device as a function of the comparison.

11. A method for automatic license plate recognition of a vehicle, the method comprises:
  receiving, by a user device of a data collection unit, a plurality of reference indicators from a user;
  associating, by the user device of the data collection unit, at least a right to the plurality of reference indicators, wherein the right is determined based on a membership status of the user, and wherein the right enables the user to access one or more services within a vehicle service site;
  capturing, by at least an image capturing device of the data collection unit, a plurality of vehicle images of a vehicle from a plurality of angles and distances, wherein at least a vehicle image of the plurality of vehicle images comprises a license plate region;
  receiving, by an image processing module of a control module communicatively connected to the data collection unit, wherein using a machine-learning process, the plurality of vehicle images from the at least an image capturing device, wherein receiving the plurality of vehicle images further comprises retrieving the plurality of vehicle images from a data store using a query;
  processing, by the image processing module of the control module, the plurality of vehicle images, wherein processing the plurality of vehicle images comprises:
    isolating the license plate region from the at least a vehicle image as a function of a plurality of image processing techniques; and
    removing a redundancy in each vehicle images within the plurality of vehicle images;
  determining, by a computer vision module of the control module, an obscurity of the license plate region;
  reconstructing, by an image inpainting module operatively connected to the image processing module of the control module, the license plate region as a function of the obscurity of the license plate using an image inpainting technique, wherein the image inpainting technique is configured to input the license plate region to the image inpainting module, wherein the image inpainting module comprises at least one interpolation rule trained by a plurality of images to predict interpolated pixel values in a license plate context, and wherein the plurality of images are downsampled to smaller numbers of pixels;
  identifying, by the computer vision module of the control module, a plurality of indicators as a function of the license plate region;
  validating, by a validation module of the control module, the plurality of indicators as a function of the plurality of reference indicators; and
  granting, by the validation module of the control module, the at least a right associated with the plurality of reference indicators to the user as a function of the validation of the plurality of indicators.

12. The method of claim 11, wherein processing the plurality of vehicle images comprises:
  determining a degree of quality of depiction of the license plate region for each vehicle image of the plurality of vehicle images;
  ranking the plurality of vehicle images according to the degree of quality of depiction of the license plate region; and
  selecting a highest-ranking vehicle image from the plurality of vehicle images.

13. The method of claim 11, wherein isolating the license plate region from the at least a vehicle image comprises:
  determining a region of interest (ROI) as a function of a plurality of license plate parameters identified using an edge detection technique; and
  isolating the license plate region from the at least a vehicle image based on the ROI.

14. The method of claim 11, wherein isolating the license plate region from the at least a vehicle image comprises:
  segmenting the license plate region into a plurality of license plate sub-regions, wherein each license plate sub-regions of the plurality of license plate sub-regions comprises at least an indicator.

15. The method of claim 11, wherein determining the obscurity of the license plate region comprises computing a plurality of image quality metrices of the license plate region.

16. The method of claim 11, wherein identifying the plurality of indicators comprises identifying the plurality of indicators using optical character recognition (OCR).

17. The method of claim 11, wherein identifying the plurality of indicator comprises:
- extracting a plurality of indicator features as a function of the license plate region;
- generating an indicator classifier using indicator training data, wherein the indicator training data comprises a plurality of indicator features as input correlated to a plurality of indicators as output; and
- identifying the plurality of indicator as a function of the license plate region using the indicator classifier.

18. The method of claim 11, wherein the image inpainting technique comprises a learning-based image inpainting technique.

19. The method of claim 11, wherein the method further comprises capturing the plurality of vehicle images of the vehicles as a function of at least a sensor, wherein the at least a sensor comprises a weight sensor.

20. The method of claim 19, wherein receiving the plurality of vehicle images further comprises:
- generating an image capture parameter;
- transmitting a command to the at least an image capturing device to take at least a vehicle image of the plurality of vehicle images with the image capture parameter;
- comparing the weight of the vehicle with a weight threshold; and
- activating the at least an image capturing device as a function of the comparison.

* * * * *